US010364345B2

(12) United States Patent
Karagiannis et al.

(10) Patent No.: US 10,364,345 B2
(45) Date of Patent: *Jul. 30, 2019

(54) MONOLITHIC INTERLAYERS OF CELLULOSE ESTER POLYVINYL ACETAL POLYMER BLENDS

(71) Applicant: Solutia Inc., St. Louis, MO (US)

(72) Inventors: Aristotelis Karagiannis, Amherst, MA (US); Bruce Edward Wade, West Springfield, MA (US); Khanh D. Tran, South Hadley, MA (US); Michael Eugene Donelson, Kingsport, TN (US)

(73) Assignee: Solutia Inc., St. Louis, MO (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/957,890

(22) Filed: Dec. 3, 2015

(65) Prior Publication Data

US 2016/0160031 A1 Jun. 9, 2016

Related U.S. Application Data

(60) Provisional application No. 62/088,839, filed on Dec. 8, 2014.

(51) Int. Cl.
| | | |
|---|---|---|
| C08L 1/14 | (2006.01) |
| C08L 29/14 | (2006.01) |
| B32B 17/08 | (2006.01) |
| B32B 27/22 | (2006.01) |
| B32B 27/36 | (2006.01) |
| B32B 27/08 | (2006.01) |
| B32B 17/10 | (2006.01) |
| B32B 27/30 | (2006.01) |
| B32B 23/04 | (2006.01) |
| B32B 23/08 | (2006.01) |
| B32B 23/20 | (2006.01) |
| B32B 27/06 | (2006.01) |
| C08K 5/103 | (2006.01) |
| B32B 23/16 | (2006.01) |
| B32B 27/42 | (2006.01) |

(52) U.S. Cl.
CPC ............. C08L 29/14 (2013.01); B32B 17/08 (2013.01); B32B 17/10036 (2013.01); B32B 17/10605 (2013.01); B32B 17/10761 (2013.01); B32B 23/04 (2013.01); B32B 23/08 (2013.01); B32B 23/16 (2013.01); B32B 23/20 (2013.01); B32B 27/06 (2013.01); B32B 27/08 (2013.01); B32B 27/22 (2013.01); B32B 27/306 (2013.01); B32B 27/308 (2013.01); B32B 27/36 (2013.01); B32B 27/365 (2013.01); B32B 27/42 (2013.01); C08K 5/103 (2013.01); C08L 1/14 (2013.01); B32B 2250/03 (2013.01); B32B 2250/24 (2013.01); B32B 2250/40 (2013.01); B32B 2270/00 (2013.01); B32B 2307/40 (2013.01); B32B 2307/412 (2013.01); B32B 2307/418 (2013.01); B32B 2307/546 (2013.01); B32B 2307/558 (2013.01); B32B 2307/71 (2013.01); B32B 2307/732 (2013.01); B32B 2419/00 (2013.01); B32B 2457/00 (2013.01); B32B 2551/00 (2013.01); B32B 2607/00 (2013.01); B32B 2607/02 (2013.01)

(58) Field of Classification Search
None
See application file for complete search history.

(56) References Cited

U.S. PATENT DOCUMENTS

| | | | |
|---|---|---|---|
| 1,683,347 A | 9/1928 | Gray et al. |
| 1,698,049 A | 1/1929 | Clarke et al. |
| 1,880,560 A | 10/1932 | Webber et al. |
| 1,880,808 A | 10/1934 | Clarke et al. |
| 1,984,147 A | 10/1934 | Malm |
| 2,067,310 A | 1/1937 | Auden |
| 2,129,052 A | 9/1938 | Fordyce |
| 2,231,818 A | 2/1941 | Rodman et al. |
| 2,282,026 A | 5/1942 | Bren et al. |
| 2,282,057 A | 5/1942 | Hopkins et al. |
| 3,617,201 A | 11/1971 | Berni et al. |
| 3,762,981 A | 10/1973 | Blank |
| 4,009,030 A | 2/1977 | Abel |
| 4,029,849 A | 6/1977 | Abel |
| 4,952,457 A | 8/1990 | Cartier et al. |
| 4,968,745 A * | 11/1990 | Misra .................. C08F 8/28 |
| | | | 525/61 |
| 5,137,954 A | 8/1992 | DasGupta et al. |
| 5,728,472 A | 3/1998 | D'Errico |

(Continued)

OTHER PUBLICATIONS

Copending U.S. Appl. No. 14/958,005, filed Dec. 3, 2015, Karagiannis et al., now publication No. 2016-0159044.

(Continued)

Primary Examiner — Sheeba Ahmed
(74) Attorney, Agent, or Firm — Steven A. Owen; Dennis V. Carmen

(57) ABSTRACT

An monolithic interlayer with high stiffness and when laminated into a glass panel, the glass panel exhibits good clarity, while maintaining the processability of a polyvinyl acetal, such as polyvinyl butyral resin used to make the monolithic interlayer. The monolithic interlayer comprising a polymer blend of:

(A) polyvinyl acetal (e.g. PVB); and (B) one or more cellulose esters.

The polymer blend increases the structural strength to the monolithic interlayer by increasing the E' modulus of the monolithic interlayer while optionally maintaining good optical clarity.

23 Claims, No Drawings

(56) References Cited

U.S. PATENT DOCUMENTS

| | | | |
|---|---|---|---|
| 6,461,718 | B2 | 10/2002 | Mori |
| 6,825,255 | B2 | 11/2004 | Yuan et al. |
| 7,883,761 | B2 | 2/2011 | Bourcier et al. |
| 7,901,780 | B2 | 3/2011 | Chen et al. |
| 8,399,098 | B2 | 3/2013 | Bennison et al. |
| 10,293,577 | B2 | 5/2019 | Karagiannis et al. |
| 10,293,578 | B2 | 5/2019 | Karagiannis et al. |
| 2001/0006451 | A1 | 7/2001 | Miyazaki et al. |
| 2001/0023009 | A1* | 9/2001 | Mori ............ G02B 5/128 428/141 |
| 2003/0161997 | A1 | 8/2003 | Moran |
| 2007/0009714 | A1 | 1/2007 | Lee et al. |
| 2010/0129665 | A1 | 5/2010 | Chou |
| 2012/0297964 | A1* | 11/2012 | Carberry ........... F41H 5/0407 89/36.02 |
| 2013/0236693 | A1 | 9/2013 | Lu |
| 2013/0236711 | A1 | 9/2013 | Lu |
| 2014/0092468 | A1 | 4/2014 | Takamuki |
| 2016/0159044 | A1 | 6/2016 | Karagiannis et al. |
| 2016/0159045 | A1 | 6/2016 | Karagiannis et al. |
| 2016/0160031 | A1 | 6/2016 | Karagiannis et al. |

OTHER PUBLICATIONS

Copending U.S. Appl. No. 14/958,232, filed Dec. 3, 2015, Karagiannis et al., now publication No. 2016-0159045.

PCT International Search Report and Written Opinion dated Mar. 22, 2016 for International Application No. PCT/US2015/063904.

PCT International Search Report and Written Opinion dated Mar. 17, 2016 for International Application No. PCT/US2015/063883.

Kirk-Othmer, Encyclopedia of Chemical Technology, 5th Edition, vol. 5, Wiley-Interscience, New York (2004), pp. 394-444.

Wade, B.E., Vinyl Acetal Polymers, in Encyclopedia of Polymer Science & Technology, 3rd edition, vol. 8, pp. 381-399 (2003).

Office Action dated Oct. 20, 2017 received in co-pending U.S. Appl. No. 14/958,005.

Office Action dated Nov. 9, 2017 received in co-pending U.S. Appl. No. 14/958,232.

Office Action dated May 9, 2018 received in co-pending U.S. Appl. No. 14/958,005.

Office Action dated May 10, 2018 received in co-pending U.S. Appl. No. 14/958,232.

Office Action dated Nov. 16, 2018 in co-pending U.S. Appl. No. 14/958,005.

Notice of Allowance dated Mar. 27, 2019 in co-pending U.S. Appl. No. 14/958,005.

Notice of Allowance dated Mar. 27, 2019 in co-pending U.S. Appl. No. 14/958,232.

Copending U.S. Appl. No. 16/408,521, filed May 10, 2019, Karagiannis et al.

Copending U.S. Appl. No. 16/408,534, filed May 10, 2019, Karagiannis et al.

* cited by examiner

MONOLITHIC INTERLAYERS OF CELLULOSE ESTER POLYVINYL ACETAL POLYMER BLENDS

CROSS REFERENCE TO RELATED APPLICATIONS

This application claims priority to U.S. Provisional Application Ser. No. 62/088,839 filed Dec. 8, 2014, the disclosure of which is herein incorporated by reference in its entirety.

FIELD OF THE INVENTION

The present invention relates to monolithic poly(vinyl acetal) interlayers on glass, and more particularly to monolithic interlayer made with a polymer blend of a cellulose ester ("CE") and poly(vinyl acetal) to increase the stiffness of the monolithic interlayer while optionally providing good optical clarity in glass panels.

BACKGROUND OF THE INVENTION

Generally, multiple layer glass panels refer to a laminate comprised of a monolithic interlayer or interlayer sandwiched between two panes of glass. The laminated multiple layer glass panels are commonly utilized in architectural window applications, in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, keep the layers of glass bonded even when the force is applied and the glass is broken, and prevent the glass from breaking up into sharp pieces. Additionally, the interlayer generally gives the glass a much higher sound insulation rating, reduces UV and/or IR light transmission, and enhances the aesthetic appeal of the associated window.

The interlayer is generally produced by mixing a polymer resin such as poly(vinyl acetal) (poly(vinyl acetal)) with one or more plasticizers and melt blending or melt processing the mix into a interlayer by any applicable process or method known to one of skill in the art, including, but not limited to, extrusion. Other additional additives may optionally be added for various other purposes. After the monolithic interlayer is formed, it is typically collected and rolled for transportation and storage and for later use in the multiple layer glass panel, as described below.

The following offers a simplified description of the manner in which multiple layer glass panels are generally produced in combination with the interlayers. First, at least one monolithic interlayer is placed between two substrates and any excess interlayer is trimmed from the edges, creating an assembly. It is not uncommon for multiple interlayers to be placed within the two substrates creating a multiple layer glass panel with multiple interlayers. Then, air is removed from the assembly by an applicable process or method known to one of skill in the art; e.g., through nip rollers, vacuum bag, vacuum ring, or another de-airing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process known to one of ordinary skill in the art such as, but not limited to, autoclaving.

An emerging market in architectural laminated glass requires monolithic interlayers with structural properties. Such an interlayer is Eastman's Saflex DG which is made of plasticized polyvinyl butyral ("PVB"). A structural poly(vinyl acetal) interlayer, Saflex™ DG41 (a poly(vinyl butyral) polymer having an Mw of about 170,000, is commercially available for applications in the architectural space. Saflex™ DG interlayers are stiffer products than standard PVB interlayers and the higher stiffness allows laminates made with Saflex™ DG interlayer to sustain higher loads. Alternatively, Saflex™ DG interlayers can be used to allow a reduction in the glass thickness while achieving the same laminate loading.

Higher performance interlayers are desirable as more applications requiring such interlayers are growing (single side balcony laminates, canopies, staircases, support beams, etc).

To increase the stiffness of a thermoplastic, reinforcing fillers are often used. However, such solid fillers may not be thermoplastic polymers, and therefore can compromise adhesion to glass and/or its processability in an extruder. Where optical clarity is desired, such fillers are unsuitable if too large as they scatter light and reduce the optical clarity of a glass laminate. Smaller particles reduce the potential for light scattering but due to their high surface area, often increase the viscosity of the matrix thermoplastic resin, rendering processing difficult or impractical. There, there remains a need to increase the stiffness or rigidity using a thermoplastic polymer, and optionally maintain good optical clarity, of the laminates made with poly(vinyl acetal) interlayers while maintaining the ability of the thermoplastic poly(vinyl acetal) to process well. For many applications, the monolithic interlayer is desirable to decrease the thickness of the laminate, avoid the processing time of laying up multilayers, and decrease the failure rate of laminates off the line that have the formation of bubbles or imperfections due to faulty assembly of multilayers.

SUMMARY OF THE INVENTION

We have discovered a monolithic interlayer that has superior stiffness, and when laminated into a glass panel, the glass panel exhibits good clarity, while maintaining the processability of the poly(vinyl acetal) resin used to make the monolithic interlayer.

There is now provided a monolithic interlayer comprising a polymer blend of:
(A) poly(vinyl acetal); and
(B) one or more CEs ("CE").

Desirably, said monolithic interlayer has a thickness of at least 5 mils. The polymer blend increases the structural strength to the monolithic interlayer by increasing the E' modulus of the monolithic interlayer. Desirably, the polymer blend also provides an monolithic interlayer sheet that, when laminated to glass, has good optical clarity.

DETAILED DESCRIPTION OF THE INVENTION

The term "sheet" or "monolithic sheet" or "monolithic interlayer" is a single unitary layer or sheet formed from the thermoplastic composition of the invention. The monolithic interlayer or a sheet can contain a combination of two or more different types of polymers if desired.

A "polymer blend" means the combination of at least two different species of polymers without limitation on the method for their combination. A polymer blend is in a solid state unless otherwise expressed as a molten polymer blend. Without limitation, the polymer blend can be an immiscible polymer blend in which the monolithic interlayer will exhibit two glass transition peaks. Alternatively, the polymer blend can be a miscible or homogeneous polymer blend in which the monolithic interlayer will either exhibit one glass transition peak, or appear as a compatible polymer blend on a macroscale that exhibits exhibit uniform physical properties. A polymer blend can form a polymer-polymer complex in which a molecular entity can be formed from the two polymers and such molecular entity can be ionic or uncharged. A polymer blend may or may not form an interpenetrating or semi-interpenetrating polymer network, or form a polymer composite in which at least one of the polymers forms a continuous phase while the other polymer forms a discontinuous phase.

There is now provided a poly(vinyl acetal) monolithic interlayer comprising a polymer blend of:
(A) a polyvinyl acetal ("poly(vinyl acetal)") resin; and
(B) a CE ("CE").

The polymer blend of CE and poly(vinyl acetal) provides a monolithic interlayer having a higher stiffness than an interlayer made only with the same poly(vinyl acetal) resin. The monolithic interlayers having good optical clarity when laminated between glass, Further, the CE's can provide a dual functionality when blended with poly(vinyl acetal) resins. For instance, CEs can act as a processing aid since they can melt and flow at poly(vinyl acetal) processing temperatures, thereby breaking down into smaller particles and reducing the viscosity of the poly(vinyl acetal) composition during processing. After being dispersed throughout the poly(vinyl acetal) composition, the CEs can re-solidify upon cooling and can act as a reinforcing filler that strengthens the monolithic poly(vinyl acetal) composition.

Poly(vinyl acetal) resin compositions are desirable for various applications where modulus, strength, and elasticity are necessary. Unfortunately, adding high amounts of filler to poly(vinyl acetal) composition impairs the optical clarity of the interlayer, and depending on the type and amount of filler, can also make subsequent processing of the poly(vinyl acetal) composition very difficult due to the increased viscosity of the composition. However, the addition of CEs to poly(vinyl acetal) can remedy these deficiencies. CE's can enable the production of a monolithic interlayer that exhibits improved viscosity during processing over using solid fillers, to provide enhanced modulus and stiffness, yet simultaneously provide the necessary optical clarity required in many glass applications.

The poly(vinyl acetal) resin and the CE's are thermoplastic. Their method of manufacture is not limited.

Poly(vinyl acetal) resin can be produced by known aqueous or solvent acetalization processes, such as by reacting PVOH with an aldehyde such as butyraldehyde in the presence of an acid catalyst, separation, stabilization, and drying of the resin. Such acetalization processes are disclosed, for example, in U.S. Pat. Nos. 2,282,057 and 2,282, 026 and Vinyl Acetal Polymers, in Encyclopedia of Polymer Science & Technology, 3rd edition, Volume 8, pages 381- 399 (2003), the entire disclosures of which are incorporated herein by reference.

Poly(vinyl acetal) resins typically have a residual hydroxyl content, an ester content, and an acetal content. As used herein, residual hydroxyl content (calculated as PVOH) refers to the weight percent of moieties having a hydroxyl group remaining on the polymer chains. For example, poly (vinyl acetal) can be manufactured by hydrolyzing poly (vinyl acetate) to PVOH, and then reacting the PVOH with an aldehyde, such as butyraldehyde, propionaldehyde, and the like, and desirably butyraldehyde, to make a polymer having repeating vinyl butyral units. In the process of hydrolyzing the poly(vinyl acetate), typically not all of the acetate side groups are converted to hydroxyl groups. Further, reaction with butyraldehyde typically will not result in the conversion of all hydroxyl groups on the PVOH to acetal groups. Consequently, in any finished poly(vinyl butyral), there typically will be residual ester groups such as acetate groups (as vinyl acetate groups) and residual hydroxyl groups (as vinyl hydroxyl groups) as side groups on the polymer chain and acetal (e.g. butyral) groups (as vinyl acetal groups). As used herein, residual hydroxyl content is measured on a weight percent basis per ASTM 1396.

An example of a polyvinyl butyral structure is used to further illustrate how the weight percentages are based from the moiety unit to which is bonded the relevant pendant group:

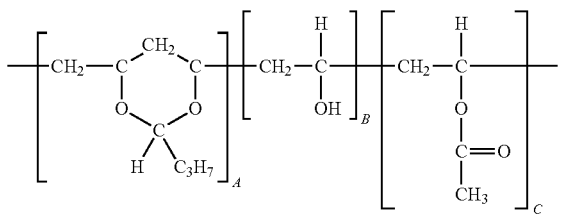

Taking the above structure of a polyvinyl butyral, the butyral or acetal content is based on the weight percentage of the unit A in the polymer, and OH content is based on the weight percentage of the unit B in the polymer (a polyvinyl OH moiety or PVOH), and the acetate or ester content is based on the weight percentage of unit C in the polymer.

Notably, for a given type of plasticizer, the compatibility of the plasticizer in the polymer is largely determined by the hydroxyl content of the polymer. Polymers with greater residual hydroxyl content are typically correlated with reduced plasticizer compatibility or capacity, typically due to the hydrophobicity of the plasticizer being more compatible with fewer hydrophilic groups present on the polymer chain. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between plasticizers present in commercial CE resins and poly(vinyl acetal) resin.

The hydroxyl group content of poly(vinyl acetal) resin is not particularly limited, but suitable amounts are from at least about 6, or at least about 8, or at least about 10, or at least about 11, or at least about 12, or at least about 13, or at least about 14, or at least about 15, or at least about 16, or at least about 17, and in each case up to about 35 wt. % PVOH. For example, suitable weight percent (wt. %) hydroxyl groups ranges calculated as PVOH include about 6 to 35, or 6 to 30, or 6 to 25, or 6 to 23, or 6 to 20, or 6 to 18, or 6 to 17, or 6 to 16, or 6 to 15, or 7 to 35, or 7 to 30, or 7 to 25, or 7 to 23, or 7 to 20, or 7 to 18, or 7 to 17, or 7 to 16, or 7 to 15, or 8 to 35, or 8 to 30, or 8 to 25, or 8 to 23, or 8 to 20, or 8 to 18, or 8 to 17, or 8 to 16, or 8 to 15, or 9 to 35, or 9 to 30, or 9 to 25, or 9 to 23, or 9 to 20, or 9 to 18, or 9 to 17, or 9 to 16, or 9 to 15, or 10 to 35, or 10 to 30, or 10 to 25, or 10 to 23, or 10 to 20, or 10 to 18, or 10 to 17, or 10 to 16, or 10 to 15, or 11 to 35, or 11 to 30, or 11 to 25, or 11 to 23, or 11 to 20, or 11 to 18, or 11 to 17, or 11 to 16, or 11 to 15, or 12 to 35, or 12 to 30, or 12 to 25, or 12 to 23, or 12 to 20, or 12 to 18, or 12 to 17, or 12 to 16, or 12 to 15, or 13 to 35, or 13 to 30, or 13 to 25, or 13 to 23, or 13 to 20, or 13 to 18, or 13 to 17, or 13 to 16, or 13 to 15, or 14 to 35, or 14 to 30, or 14 to 25, or 14 to 23, or 14 to 20, or 14 to 18, or 14 to 17, or 14 to 16, or 14 to 15, or 15 to 35, or 15 to 30, or 15 to 25, or 15 to 23, or 15 to 20, or 15 to 18, or 15 to 17, or 15 to 16, or 16 to 35, or 16 to 30, or 16 to 25, or 16 to 23, or 16 to 20, or 16 to 18, or 16 to 17, or 17 to 35, or 17 to 30, or 17 to 25, or 17 to 23, or 17 to 20, or 17 to 18. If desired, the hydroxyl wt. % as PVOH chosen can be on the lower end of the ranges. In general, a poly(vinyl acetal) polymer having a lower hydroxyl wt. % has the capability of absorbing more plasticizer and absorbing it more efficiently.

Where optical clarity is desired, however, the hydroxyl wt. % can have an influence on the refractive index of the poly(vinyl acetal) resin. Therefore, depending on the type of CE selected, the hydroxyl wt. % of the poly(vinyl acetal) can be adjusted along with the amount of plasticizer to achieve the desired refractive index where optical clarity is desirable. For example, suitable ranges of hydroxyl wt. % calculated as PVOH units, can range from 15 to 25, or 15 to 23, or 15 to 20, or 15 to 18, or 15 to 17, or 15 to 16, or 16 to 25, or 16 to 23, or 16 to 20, or 16 to 18, or 16 to 17, or 17 to 25, or 17 to 23, or 17 to 20, or 17 to 18, can be selected to enhance the optical clarity of the monolithic interlayer sheet laminated to glass.

Poly(vinyl acetal) resin used to make a layer can also comprise 20 wt. % or less, or 17 wt. % or less, or 15 wt. % or less of residual ester groups, including 13 wt. % or less, or 11 wt. % or less, or 9 wt. % or less, or 7 wt. % or less, or 5 wt. % or less, or 4 wt. % or less residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference). Suitable ranges of residual ester groups by wt. % include 0 to 20, or 0 to 17, or 0 to 15, or 0 to 13, or 0 to 11, or 0 to 9, or 0 to 7, or 0 to 5, or 0 to 4, or 1 to 17, or 1 to 15, or 1 to 13, or 1 to 11, or 1 to 9, or 1 to 7, or 1 to 5, or 1 to 4, or 1 to 20, or 1 to 17, or 1 to 15, or 1 to 13, or 1 to 11, or 1 to 9, or 1 to 7, or 1 to 5, or 1 to 4, or 2 to 20, or 2 to 17, or 2 to 15, or 2 to 13, or 2 to 11, or 2 to 9, or 2 to 7, or 2 to 5, or 2 to 4, or 3 to 20, or 3 to 17, or 3 to 15, or 3 to 13, or 3 to 11, or 3 to 9, or 3 to 7, or 3 to 5, or 3 to 4, or 3 to 20, or 3 to 17, or 3 to 15, or 3 to 13, or 3 to 11, or 3 to 9, or 3 to 7, or 3 to 5, or 3 to 4, or 4 to 20, or 4 to 17, or 4 to 15, or 4 to 13, or 4 to 11, or 4 to 9, or 4 to 7, or 4 to 5, or 6 to 20, or 6 to 17, or 6 to 15, or 6 to 13, or 6 to 11, or 6 to 9. As with the residual hydroxyl group measurement, the weight percent of residual ester groups (e.g. acetate) is based on the moiety in the polymer backbone onto which is linked the acetate group, including the pendant acetate group.

Poly(vinyl acetal) resin used in the invention can also have an acetal content of at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %. Additionally or in the alternative, the acetal content can be up to 94 wt. %, or up to 93 wt. %, or up to 92, wt. %, or up to 91.%, or up to 90 wt. %, or up to 89 wt. %, or up to 88 wt. %, or up to 86 wt. %, or up to 85 wt. %, or up to 84 wt. %, or up to 83 wt. %, or up to 82 wt. %, or up to 80 wt. %, or up to 78 wt. %, or up to 77 wt. %, or up to 75 wt. %, or up to 70 wt. %, or up to 65 wt. %. Suitable ranges of acetal content in the poly(vinyl acetal) resin used in the invention include 50 to 94, or 50 to 93, or 50 to 92, or 50 to 91, or 50 to 90, or 50 to 89, or 50 to 88, or 50 to 86, or 50 to 85, or 50 to 84, or 50 to 84, or 50 to 83, or 50 to 82, or 50 to 80, or 50 to 78, or 50 to 77, or 50 to 75, or 50 to 70, or 50 to 65, or 55 to 94, or 55 to 93, or 55 to 92, or 55 to 91, or 55 to 90, or 55 to 89, or 55 to 88, or 55 to 86, or 55 to 85, or 55 to 84, or 55 to 84, or 55 to 83, or 55 to 82, or 55 to 80, or 55 to 78, or 55 to 77, or 55 to 75, or 55 to 70, or 55 to 65, or 60 to 94, or 60 to 93, or 60 to 92, or 60 to 91, or 60 to 90, or 60 to 89, or 60 to 88, or 60 to 86, or 60 to 85, or 60 to 84, or 60 to 84, or 60 to 83, or 60 to 82, or 60 to 80, or 60 to 78, or 60 to 77, or 60 to 75, or 60 to 70, or 60 to 65, or 65 to 94, or 65 to 93, or 65 to 92, or 65 to 91, or 65 to 90, or 65 to 89, or 65 to 88, or 65 to 86, or 65 to 85, or 65 to 84, or 65 to 84, or 65 to 83, or 65 to 82, or 65 to 80, or 65 to 78, or 65 to 77, or 65 to 75, or 65 to 70, or 70 to 94, or 70 to 93, or 70 to 92, or 70 to 91, or 70 to 90, or 70 to 89, or 70 to 88, or 70 to 86, or 70 to 85, or 70 to 84, or 70 to 84, or 70 to 83, or 70 to 82, or 70 to 80, or 70 to 78, or 70 to 77, or 70 to 75, or 75 to 94, or 75 to 93, or 75 to 92, or 75 to 91, or 75 to 90, or 75 to 89, or 75 to 88, or 75 to 86, or 75 to 85, or 75 to 84, or 75 to 84, or 75 to 83, or 75 to 82, or 75 to 80, or 75 to 78, or 75 to 77, 80 to 94, or 80 to 93, or 80 to 92, or 80 to 91, or 80 to 90, or 89 to 89, or 80 to 88, or 80 to 86, or 80 to 85, or 80 to 84, or 80 to 83, or 80 to 82, 85 to 94, or 85 to 93, or 85 to 92, or 85 to 91, or 85 to 90, or 85 to 89, or 85 to 88, or 85 to 86, or 90 to 94, or 90 to 93, or 90 to 92.

The combination of OH, ester, and acetal ranges is not particularly limited. On a weight basis, commercial PVB typically comprises less than 22%, usually about 17 to 19% hydroxyl groups calculated as polyvinyl alcohol (PVOH); up to 10%, usually 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

Some of the range combinations can be those corresponding to the checked boxes in Table 1 below.

TABLE 1

| OH wt. % | Ester wt % | | | | | | | | | | | | | |
|---|---|---|---|---|---|---|---|---|---|---|---|---|---|---|
| | 0-20 | 1-20 | 2-17 | 2-15 | 2-13 | 2-8 | 2-6 | 3-20 | 3-15 | 0-13 | 3-11 | 3-9 | 4-20 | 4-17 | 4-15 |
| 6-25 | X | X | | X | X | X | X | X | X | | X | X | X | X | X |
| 7-25 | X | X | | X | | X | X | | | | | X | X | X | X |
| 8-25 | X | X | | X | | | | | | | | X | | X | X |
| 9-25 | X | X | | X | | | | | | | | | | | |

TABLE 1-continued

| OH wt. % | Ester wt % | | | | | | | | | | | | | |
|---|---|---|---|---|---|---|---|---|---|---|---|---|---|---|
| | 0-20 | 1-20 | 2-17 | 2-15 | 2-13 | 2-8 | 2-6 | 3-20 | 3-15 | 0-13 | 3-11 | 3-9 | 4-20 | 4-17 | 4-15 |
| 10-25 | X | X | | X | | | | | | | | | | | |
| 6-23 | | X | X | X | X | X | X | X | X | | X | X | X | X | X |
| 8-23 | | X | | X | | | | | | | | x | | X | X |
| 9-23 | | X | | X | | | | | | | | | | | |
| 6-20 | | X | X | X | X | X | X | X | X | | X | X | X | X | X |
| 8-20 | | X | | X | | | | | | | | x | | X | X |
| 9-20 | | X | | X | | | | | | | | | | | |
| 10-20 | | X | | X | | | | | | | | | | | |
| 6-18 | | X | X | X | X | X | X | X | X | | X | X | X | X | X |
| 15-23 | | | | | | | | | | X | | | | | |
| 15-20 | | | | | | | | | | X | | | | | |
| 17-23 | | | | | | | | | | X | | | | | |
| 17-20 | | | | | | | | | | X | | | | | |
| 9-18 | | X | | X | | | | | | | | | | | |
| 10-18 | | X | | X | | | | | | | | | | | |
| 6-15 | | X | X | X | X | X | X | X | X | | X | X | X | X | X |
| 8-15 | | X | | X | | | | | | | | X | | X | X |
| 10-15 | | X | | X | | | | | | | | | | | |
| Acetal Wt. % | 50-94 | 65-89 | 70-92 | 70-88 | 90-92 | 70-91 | 75-91 | 65-91 | 70-91 | 70-84 | 75-91 | 65-89 | 75-89 | 70-88 | 75-88 |

The acetal groups are not limited. Examples include vinyl propynal groups and vinyl butyral groups, and are desirably vinyl butyral groups.

The weight average molecular weight of the poly(vinyl acetal) resin is not particularly limited. The poly(vinyl acetal) resin can have a weight average molecular weight ($M_w$) of 40,000 to 300,000 Daltons as measured by size exclusion chromatography using the low angle laser light scattering (SEC/LALLS) method of Cotts and Ouano in tetra-hydrofuran.

Examples of suitable Mw ranges for the poly(vinyl acetal) resins include 40,000 to 300,000, or 40,000 to 250,000, or 40,000 to 220,000, or 40,000 to 200,000, or 40,000 to 190,000, or 40,000 to 170,000, or 40,000 to 160,000, or 40,000 to 140,000, or 40,000 to 120,000, or 40,000 to 100,000, or 40,000 to 90,000, or 40,000 to 70,000, or 70,000 to 300,000, or 70,000 to 250,000, or 70,000 to 220,000, or 70,000 to 200,000, or 70,000 to 190,000, or 70,000 to 170,000, or 70,000 to 160,000, or 70,000 to 140,000, or 70,000 to 120,000, or 70,000 to 100,000, or 70,000 to 90,000, or 90,000 to 300,000, or 90,000 to 250,000, or 90,000 to 220,000, or 90,000 to 200,000, or 90,000 to 190,000, or 90,000 to 170,000, or 90,000 to 160,000, or 90,000 to 140,000, or 90,000 to 120,000, or 90,000 to 100,000, or 120,000 to 300,000, or 120,000 to 250,000, or 120,000 to 220,000, or 120,000 to 200,000, or 120,000 to 190,000, or 120,000 to 170,000, or 120,000 to 160,000, or 120,000 to 140,000, or 160,000 300,000, or 160,000 to 250,000, or 160,000 to 220,000, or 160,000 to 200,000, or 160,000 to 190,000.

The poly(vinyl acetal) resins used to combine with the CE's are desirably PVB resins. In this regard, the poly(vinyl acetal) resin desirably comprises at least PVB in an amount of at least 60 wt. %, or at least 65 wt. %, or at least 70 wt. %, or at least 75 wt. %, or at least 80 wt. %, or at least 85 wt. %, or at least 90 wt. % or at least 95 wt. %, or at least 98 wt. %, based on the weight of all polymers (excluding plasticizers) in the poly(vinyl acetal) composition.

The interlayer has a Tg peak that is generally less than 50° C. The interlayer may have more than one Tg peak, representing a poly(vinyl acetal) phase and a CE phase. Whether the interlayer has one Tg peak or multiple Tg peaks, the interlayer desirably has a low Tg peak that is desirably 50° C. or less. The low Tg value in the interlayer can contribute to a higher glass/interlayer adhesion and/or a better ability to absorb impact energy. Desirably the interlayer has a Tg peak of 50° C. or less, or not greater than 49° C., or not greater than 48° C., or not greater than 47° C., or not greater than 46° C., or not greater than 45° C., or not greater than 44° C., or not greater than 43° C., or not greater than 42° C., or not greater than 41° C., or not greater than 40° C., or not greater than 39° C., or not greater than 38° C., or not greater than 37° C., or not greater than 36° C., or not greater than 37° C., or not greater than 36° C., or not greater than 35° C., or not greater than 34° C., or not greater than 33° C., or not greater than 32° C., or not greater than 31° C., or not greater than 30° C., and in each case at least −20° C.

In an interlayer having two or more Tg peaks, the Tg of a poly(vinyl acetal) phase can, if desired, be at least −20° C., or at least 0° C., or at least 10° C., or at least 20° C., or at least 30° C., or at least 40° C., or at least 45° C., or at least 50° C., or at least 60° C., or at least 65° C., or at least 70° C., or at least 75° C., or at least 80° C., or at least 85° C., or at least 90° C., or at least 95° C., or at least 100° C., or at least 110° C., or at least 120° C., or at least 130° C. less than the Tg of at least one CE phase.

The Tg of the interlayer is determined by rheometric dynamic analysis using the following procedure. The poly (vinyl acetal) sheet is molded into a sample disc of 25 millimeters (mm) in diameter. The poly(vinyl acetal) sample disc is placed between two 25 mm diameter parallel plate test fixtures of a Rheometrics Dynamic Spectrometer II. The poly(vinyl acetal) sample disc is tested in shear mode at an oscillation frequency of 1 Hertz as the temperature of the poly(vinyl acetal) sample is increased from −20 to 70° C. at a rate of 2° C./minute. The position of the maximum value of an delta (damping) plotted as dependent on temperature is used to determine Tg. Experience indicates that the method is reproducible to within +/−1° C.

Anti-blocking agents may also be added to the composition of the present invention to reduce the level of blocking of the interlayer. Desirably, they are added to the skin layer, or a poly(vinyl acetal) resin. Anti-blocking agents are known in the art, and any anti-blocking agent that does not adversely affect the properties of the interlayer may be used. A particularly preferred anti-blocking agent that can be successfully used as in the monolithic interlayer while not affecting optical properties of the interlayer or the adhesive properties of the interlayer to glass is a fatty acid amide (see, for example, U.S. Pat. No. 6,825,255, the entire disclosure of which is incorporated herein).

Other additives may be incorporated into the poly(vinyl acetal) resin to enhance its performance in a final product and impart certain additional properties to the interlayer. Such additives include, but are not limited to, dyes, pigments, stabilizers (e.g., ultraviolet stabilizers), antioxidants, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

The additives, in liquid, powder, or pellet form, are often used and can be mixed into the thermoplastic resin or plasticizer prior to arriving in the extruder device or combined with the thermoplastic resin inside the extruder device. These additives are incorporated into the thermoplastic composition, and by extension the resultant monolithic interlayer, to enhance certain properties of the interlayer and its performance in a multiple layer glass panel product.

CE

The following description of CE's applies to all CE resins and CE's used in the monolithic interlayer. As mentioned above, the invention include a composition comprising:

(A) poly(vinyl acetal); and
(B) one or more CEs.

The CEs useful in the present invention can be prepared using techniques known in the art or can be commercially obtained, e.g., from Eastman Chemical Company, Kingsport, Tenn., U.S.A.

The CE used in the present invention generally comprise repeating units of the structure:

Formula 1

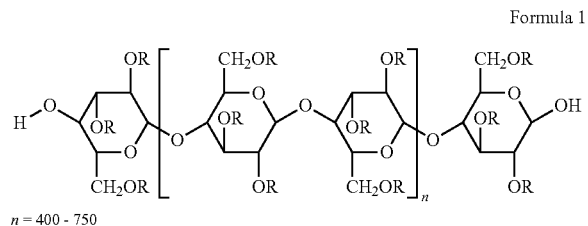

$n = 400 - 750$ wherein R may be selected independently from the group consisting of hydrogen or a straight chain alkanoyl (also referred to as acyl) (which forms an ester group when bonded to O) having from 2 to 10 carbon atoms. For CEs, the substitution level is usually expressed in terms of degree of substitution ("DS"), which is the average number of substituents per anhydroglucose unit ("AGU"). The above formula between brackets shows 2 AGUs. Generally, conventional cellulose contains three hydroxyl groups per AGU that can be substituted; therefore, the DS can have a value between zero and three. Generally, cellulose is a large polysaccharide with a degree of polymerization from 110 to 375 and a maximum DS of 3.0.

Because DS is a statistical mean value, a value of 1 does not assure that every AGU has a single substituent. In some cases, there can be unsubstituted AGUs, some with two substituents, and some with three substituents. The CEs can have an total acyl group content ("TAG"), which is the combination of all R acyl groups including the acetyl, propionyl, butyryl, etc., on a weight % basis (total weight of acyl groups divided by total weight of the CE) of at least about 15, or at least 20, or at least 25, or at least 30, or at least 35, or at least 37%, or at least 40, or at least 45 wt. %. The upper amount is not particularly limited, and can be as high as complete substitution of all hydroxyl groups, or up to 60 wt. %, or up to 55 wt. %. The particular total acyl group content by wt. % selected will depend on the type of acyl group substituents bonded to the CE backbone, as well as the properties desired. An increase in the TAG content generally renders the CE polymer more hydrophobic, increases it Tg, and improves its flexibility. Suitable ranges of TAG content on a weight % basis range from 15 to 60, or 15 to 55, or 20 to 60, or 20 to 55, or 25 to 60, or 25 to 55, or 30 to 60, or 30 to 55, or 35 to 60, or 35 to 55, or 37 to 60, or 37 to 55, or 40 to 60, or 40 to 55, or 45 to 60, or 45 to 55. To improve interfacial compatibility with a PVB film and/or enhance the Tg of the CE resin, the TAG content on a weight basis is generally in a range from 30-60, or 35 to 55, or 40-60, or 45-55.

The "total DS" is defined as the average number of acyl substituents per AGU, the substituents being any one or more R groups having C1-10 carbons, desirably 2-4 carbons. In one embodiment of the invention, the CEs can have a total DS per AGU (total DS/AGU) of at least 1, or at least 1.2, or at least 1.5, or at least 1.7, or at least 1.9, or at least 2, or at least 2.2, or at least 2.3, or at least 2.4, or at least 2.5, or at least 2.6, and can be up to 6, or up to 5, or up to 4, or up to 3.5, or up to 3.3, or up to 3, or up to 2.95, or up to 2.90, or up to 2.85, or up to 2.8, or up to 2.75, or up to 2.7, or up to 2.6, or up to 2.5, or up to 2.45, or up to 2.4, or up to 2.35, or up to 2.3, or up to 2.25, or up to 2.2, or up to 2.15, or up to 2.1. Suitable ranges are 1-6, or 1-5, or 1-4, or 1-3.5, or 1-3, or 1-2.95, or 1-2.90, or 1-2.85, or 1-2.80, or 1-2.75, or 1-2.7, or 1-2.6, or 1-2.5, or 1-2.45, or 1-2.4, or 1-2.35, or 1-2.3, or 1-2.25, or 1-2.2, or 1-2.15, or 1-2.1, or 1.2-6, or 1.2-5, or 1.2-4, or 1.2-3.5, or 1.2-3, or 1.2-2.95, or 1.2-2.90, or 1.2-2.85, or 1.2-2.80, or 1.2-2.75, or 1.2-2.7, or 1.2-2.6, or 1.2-2.5, or 1.2-2.45, or 1.2-2.4, or 1.2-2.35, or 1.2-2.3, or 1.2-2.25, or 1.2-2.2, or 1.2-2.15, or 1.2-2.1, or 1.5-6, or 1.5-5, or 1.5-4, or 1.5-3.5, or 1.5-3, or 1.5-2.95, or 1.5-2.90, or 1.5-2.85, or 1.5-2.80, or 1.5-2.75, or 1.5-2.7, or 1.5-2.6, or 1.5-2.5, or 1.5-2.45, or 1.5-2.4, or 1.5-2.35, or 1.5-2.3, or 1.5-2.25, or 1.5-2.2, or 1.5-2.15, or 1.5-2.1, or 1.7-6, or 1.7-5, or 1.7-4, or 1.7-3.5, or 1.7-3, or 1.7-2.95, or 1.7-2.90, or 1.7-2.85, or 1.7-2.80, or 1.7-2.75, or 1.7-2.7, or 1.7-2.6, or 1.7-2.5, or 1.7-2.45, or 1.7-2.4, or 1.7-2.35, or 1.7-2.3, or 1.7-2.25, or 1.7-2.2, or 1.7-2.15, or 1.7-2.1, or 2-6, or 2-5, or 2-4, or 2-3.5, or 2-3, or 2-2.95, or 2-2.90, or 2-2.85, or 2-2.80, or 2-2.75, or 2-2.7, or 2-2.6, or 2-2.5, or 2-2.45, or 2-2.4, or 2-2.35, or 2-2.3, or 2-2.25, or 2-2.2, or 2-2.15, or 2-2.1, or 2.2-6, or 2.2-5, or 2.2-4, or 2.2-3.5, or 2.2-3, or 2.2-2.95, or 2.2-2.90, or 2.2-2.85, or 2.2-2.80, or 2.2-2.75, or 2.2-2.7, or 2.2-2.6, or 2.2-2.5, or 2.2-2.45, or 2.2-2.4, or 2.2-2.35, or 2.2-2.3, or 2.2-2.25, or 2.2-2.2, or 2.2-2.15, or 2.2-2.1, or 2.3-6, or 2.3-5, or 2.3-4, or 2.3-3.5, or 2.3-3, or 2.3-2.95, or 2.3-2.90, or 2.3-2.85, or 2.3-2.80, or 2.3-2.75, or 2.3-2.7, or 2.3-2.6, or 2.3-2.5, or 2.3-2.45, or 2.3-2.4, or 2.3-2.35, or 2.4-6, or 2.4-5, or 2.4-4, or 2.4-3.5, or 2.4-3, or 2.4-2.95, or 2.4-2.90, or 2.4-2.85, or 2.4-2.80, or 2.4-2.75, or 2.4-2.7, or 2.4-2.6, or 2.4-2.5, or 2.4-2.45, or 2.5-6, or 2.5-5, or 2.5-4, or 2.5-3.5, or 2.5-3, or 2.5-2.95, or 2.5-2.90, or 2.5-2.85, or 2.5-2.80, or 2.5-2.75, or 2.5-2.7, or 2.5-2.6, or 2.6-6, or 2.6-5, or 2.6-4, or 2.6-3.5, or 2.6-3, or 2.6-2.95, or 2.6-2.90, or 2.6-2.85, or 2.6-2.80, or 2.6-2.75, or 2.6-2.7, or 2.7-6, or 2.7-5, or 2.7-4, or 2.7-3.5, or 2.7-3, or 2.7-2.95, or 2.7-2.90, or 2.7-2.85, or 2.7-2.80. Desirably, the AG DS/AGU will be in a range of 2-3.5, or 2-3, or 2-2.95, or 2-2.90, or 2-2.85, or 2-2.80, or 2.2-3.5, or 2.2-3, or 2.2-2.95, or 2.2-2.90, or 2.2-2.85, or 2.2-2.80, or 2.3-3.5, or 2.3-3, or 2.3-2.95, or 2.3-2.90, or 2.3-2.85, or 2.3-2.80, or 2.4-3.5, or 2.4-3, or 2.4-2.95, or 2.4-2.90, or 2.4-2.85, or 2.4-2.80, or 2.5-3.5, or 2.5-3, or 2.5-2.95, or 2.5-2.90, or 2.5-2.85, or 2.5-2.80, 2.6-3.5, or 2.6-3, or 2.6-2.95, or 2.6-2.90, or 2.6-2.85, or 2.6-2.80, or 2.7-3.5, or 2.7-3, or 2.7-2.95, or 2.7-2.90, or 2.7-2.85, or 2.7-2.80. Generally, the DS/AGU for the AG's will be in the range of 2.3-3, or 2.3-2.95, or 2.3-2.90, or 2.3-2.85, or 2.3-2.80, or 2.4-3, or 2.4-2.95, or 2.4-2.90, or 2.4-2.85, or 2.4-2.80, or 2.5-3, or 2.5-2.95, or 2.5-2.90, or 2.5-2.85, or 2.5-2.80, 2.6-3, or 2.6-2.95, or 2.6-2.90, or 2.6-2.85, or 2.6-2.80, or 2.7-3, or 2.7-2.95, or 2.7-2.90, or 2.7-2.85, or 2.7-2.80.

The CEs can have a hydroxyl content of at least about 0.5, or at least 0.6, or at least 0.7, or at least 0.8, or at least 0.9, or at least 1.0, or at least 1.1, or at least 1.2, or at least 1.4, or at least 1.6, or at least 1.8, or at least 2.0, or at least 2.5, or at least 3, or at least 3.5, or at least 4, in each case as wt. %. Additionally or in the alternative, the CE can have a hydroxyl content of up to about 10, or up to about 9 or up to about 8, or up to about 7 or up to 6, or up to 5.5, or up to 5, or up to 4.5, or up to 3, or up to 2.3, or up to 2. The weight percent of hydroxyl content is based dividing the combined weight of all hydroxyl groups by the weight of the entire CE polymer. Suitable ranges of hydroxyl content are 0.5 to 10, or 0.5 to 9, or 0.5 to 8, or 0.5 to 7, or 0.5 to 6, or 0.5 to 5.5, or 0.5 to 5, or 0.5 to 4.5, or 0.5 to 3, or 0.5 to 2.3, or 0.5 to 2, or 0.6 to 8, or 0.6 to 7, or 0.6 to 6, or 0.6 to 5.5, or 0.6 to 5, or 0.6 to 4.5, or 0.6 to 3, or 0.6 to 2.3, or 0.6 to 2, or 0.7 to 8, or 0.7 to 7, or 0.7 to 6, or 0.7 to 5.5, or 0.7 to 5, or 0.7 to 4.5, or 0.7 to 3, or 0.7 to 2.3, or 0.7 to 2, or 0.8 to 8, or 0.8 to 7, or 0.8 to 6, or 0.8 to 5.5, or 0.8 to 5, or 0.8 to 4.5, or 0.8 to 3, or 0.8 to 2.3, or 0.8 to 2, or 0.9 to 8, or 0.9 to 7, or 0.9 to 6, or 0.9 to 5.5, or 0.9 to 5, or 0.9 to 4.5, or 0.9 to 3, or 0.9 to 2.3, or 0.9 to 2, or 1 to 8, or 1 to 7, or 1 to 6, or 1 to 5.5, or 1 to 5, or 1 to 4.5, or 1 to 3, or 1 to 2.3, or 1 to 2, or 1.1 to 8, or 1.1 to 7, or 1.1 to 6, or 1.1 to 5.5, or 1.1 to 5, or 1.1 to 4.5, or 1.1 to 3, or 1.1 to 2.3, or 1.1 to 2, or 1.2 to 8, or 1.2 to 7, or 1.2 to 6, or 1.2 to 5.5, or 1.2 to 5, or 1.2 to 4.5, or 1.2 to 3, or 1.2 to 2.3, or 1.2 to 2, or 1.3 to 8, or 1.3 to 7, or 1.3 to 6, or 1.3 to 5.5, or 1.3 to 5, or 1.3 to 4.5, or 1.3 to 3, or 1.3 to 2.3, or 1.3 to 2, or 1.4 to 8, or 1.4 to 7, or 1.4 to 6, or 1.4 to 5.5, or 1.4 to 5, or 1.4 to 4.5, or 1.4 to 3, or 1.4 to 2.3, or 1.4 to 2, or 1.5 to 8, or 1.5 to 7, or 1.5 to 6, or 1.5 to 5.5, or 1.5 to 5, or 1.5 to 4.5, or 1.5 to 3, or 1.5 to 2.3, or 1.5 to 2, or 1.6 to 8, or 1.6 to 7, or 1.6 to 6, or 1.6 to 5.5, or 1.6 to 5, or 1.6 to 4.5, or 1.6 to 3, or 1.6 to 2.3, or 1.6 to 2, or 1.7 to 8, or 1.7 to 7, or 1.7 to 6, or 1.7 to 5.5, or 1.7 to 5, or 1.7 to 4.5, or 1.7 to 3, or 1.7 to 2.3, or 1.7 to 2, or 1.8 to 8, or 1.8 to 7, or 1.8 to 6, or 1.8 to 5.5, or 1.8 to 5, or 1.8 to 4.5, or 1.8 to 3, or 1.8 to 2.3, or 1.8 to 2, or 1.9 to 8, or 1.9 to 7, or 1.9 to 6, or 1.9 to 5.5, or 1.9 to 5, or 1.9 to 4.5, or 1.9 to 3, or 1.9 to 2.3, or 1.9 to 2, or 2 to 8, or 2 to 7, or 2 to 6, or 2 to 5.5, or 2 to 5, or 2 to 4.5, or 2 to 3, or 2 to 2.3, or 2.1 to 8, or 2.1 to 7, or 2.1 to 6, or 2.1 to 5.5, or 2.1 to 5, or 2.1 to 4.5, or 2.2 to 8, or 2.2 to 7, or 2.2 to 6, or 2.2 to 5.5, or 2.2 to 5, or 2.2 to 4.5, or 2.3 to 8, or 2.3 to 7, or 2.3 to 6, or 2.3 to 5.5, or 2.3 to 5, or 2.3 to 4.5, or 2.5 to 8, or 2.5 to 7, or 2.5 to 6, or 2.5 to 5.5, or 2.5 to 5, or 2.5 to 4.5, or 2.5 to 3, or 3 to 8, or 3 to 7, or 3 to 6, or 3 to 5.5, or 3 to 5, or 3 to 4.5, or 3.5 to 8, or 3.5 to 7, or 3.5 to 6, or 3.5 to 5.5, or 3.5 to 5, or 3.5 to 4.5, or 4 to 8, or 4 to 7, or 4 to 6, or 4 to 5.5, or 4 to 5, in each case as a wt %.

An alternative measure of the hydroxyl content is on the basis of the 3-total acetyl DS/AGU, the remainder being the average number of hydroxyl sites per AGU (OH#/AGU). For example, if the total acetyl DS/AGU is 2.6, the average OH#/AGU is 0.4. The OH#/AGU is not a measure of substitution per AGU, but rather an average number of OH sites that are not substituted. The average OH#/AGU of hydroxyl groups can be from at least 0, or at least 0.005, or at least 0.05, or at least 0.1, or at least 0.15, or at least 0.2, or at least 0.25 or at least 0.3, or at least 0.35, or at least 0.4 DS. In each case, the average OH#/AGU can be up to 1.3, or up to 1.2, or up to 1, or up to 0.9, or up to 0.8, or up to 0.7, or up to 0.65, or up to 0.6, or up to 0.55, or up to 0.5, or up to 0.45, or up to 0.4, or up to 0.35, or up to 0.3. Suitable ranges of average OH#/AGU include 0.005 to 0.7, or 0.005 to 0.65, or 0.005 to 0.60, or 0.005 to 0.55, or 0.005 to 0.50, or 0.005 to 0.45, or 0.005 to 0.40, or 0.005 to 0.35, or 0.005 to 0.30, or 0.05 to 0.7, or 0.05 to 0.65, or 0.05 to 0.60, or 0.05 to 0.55, or 0.05 to 0.50, or 0.05 to 0.45, or 0.05 to 0.40, or 0.05 to 0.35, or 0.05 to 0.30, or 0.1 to 0.7, or 0.1 to 0.65, or 0.1 to 0.60, or 0.1 to 0.55, or 0.1 to 0.50, or 0.1 to 0.45, or 0.1 to 0.40, or 0.1 to 0.35, or 0.1 to 0.30, or 0.15 to 0.7, or 0.15 to 0.65, or 0.15 to 0.60, or 0.15 to 0.55, or 0.15 to 0.50, or 0.15 to 0.45, or 0.15 to 0.40, or 0.15 to 0.35, or 0.15 to 0.30, or 0.2 to 0.7, or 0.2 to 0.65, or 0.2 to 0.60, or 0.2 to 0.55, or 0.2 to 0.50, or 0.2 to 0.45, or 0.2 to 0.40, or 0.2 to 0.35, or 0.2 to 0.30, or 0.25 to 0.7, or 0.25 to 0.65, or 0.25 to 0.60, or 0.25 to 0.55, or 0.25 to 0.50, or 0.25 to 0.45, or 0.25 to 0.40, or 0.25 to 0.35, or 0.25 to 0.30, or 0.3 to 0.7, or 0.3 to 0.65, or 0.3 to 0.60, or 0.3 to 0.55, or 0.3 to 0.50, or 0.3 to 0.45, or 0.3 to 0.40, or 0.3 to 0.35, or 0.3 to 0.30. The hydroxyl number can be adjusted to increase its wettability and solubility in alcohols by increasing the hydroxyl number. The hydroxyl number can be adjusted to enhance compatibility of the CE film to the PVB film, which also contains a hydroxyl content. Generally, the average OH#/AGU is in the range of 0.005 to 0.5, or 0.005 to 0.45, or 0.005 to 0.40, or 0.005 to 0.35, or 0.1 to 0.4, or 0.1 to 0.35.

The DS/AGU can also refer to a particular substituent, such as, for example, hydroxyl, acetyl, butyryl, or propionyl. For instance, a cellulose acetate can have an acetyl DS/AGU of about 2.0 to about 2.5, with the remainder being hydroxyl groups, while a cellulose acetate propionate ("CAP") and cellulose acetate butyrate ("CAB") can have a total DS/AGU of about 1.7 to about 2.8, with the remainder being hydroxyl groups.

The CE can be a cellulose triester or a secondary CE. Examples of cellulose triesters include, but are not limited to, cellulose triacetate, cellulose tripropionate, or cellulose tributyrate. Examples of secondary CEs include cellulose acetate, cellulose acetate propionate, and cellulose acetate butyrate. These CEs are described in U.S. Pat. Nos. 1,698,049; 1,683,347; 1,880.808; 1,880,560; 1,984,147, 2,129,052; and 3,617,201, which are incorporated herein by reference in their entirety to the extent they do not contradict the statements herein.

The CE can be a cellulose acetate, cellulose acetate propionate, cellulose acetate butyrate, cellulose triacetate, cellulose diacetate, cellulose tripropionate, cellulose tributyrate, and mixtures thereof. Desirably, the CE is a cellulose acetate, cellulose acetate propionate, cellulose acetate butyrate, or mixtures thereof. The CE can be substituted with acetyl, propionyl, butyryl, or any aliphatic alkanoyl groups having 1 or more carbons up to 10. Desirably, the CE is substituted with C2-C4 alkanoyl groups. For example, the CE can be substituted with acetyl, propionate, or butyryl groups, either alone or in combination such as acetyl propionyl or acetyl butyryl. The CE made with these substituents will have an acetyl group content, a propionyl group content, and/or a butyryl group content.

The CE can have an acetyl group content that varies widely depending on whether the CE is a cellulose acetate polymer or a mixed CE. A mixed CE is a CE that has a mixture of 2 or more different R groups on the CE polymer backbone that are present by virtue of adding the corresponding reactants into a reaction mixture. Generally, a mixed CE will have a mixture of R=2 (acetyl) with other R groups, typically R=3 or 4.

In general, the acetyl group content of the CE, on weight % basis (based on the combined weight of acetyl groups divided by the entire CE polymer) can be at least 2, or at least 3, or at least 4, or at least 4.5 wt. %. Additionally or in the alternative, the acetyl group content can be up to 50, or up to 45, or up to 40, or up to 30 wt. %, or up to 25, or up to 20, or up to 15, or up to 10, or up to 8, or up to 6, or up to 5 wt. %. Suitable ranges include, by wt. %, from 2-50, or 2-45, or 2-40, or 2-35, or 2-30, or 2 to 25, or 2-20, or 2-15, or 2-10, or 2-8, or 2-6, or 2-5, or 3-50, or 3-45, or 3-40, or 3-35, or 3-30, or 3 to 25, or 3-20, or 3-15, or 3-10, or 3-8, or 3-6, or 3-5, or 4-50, or 4-45, or 4-40, or 4-35, or 4-30, or 4-25, or 4-20, or 4-15, or 4-10, or 4-8, or 4-6, or 4-5, or 4.5-50, or 4.5-45, or 4.5-40, or 4.5-35, or 4.5-30, or 4.5-25, or 4.5-20, or 4.5-15, or 4.5-10, or 4.5-8, or 4.5-6, or 4.5-5 wt. %.

The acetyl DS/AGU in a CE can be at least greater than 0, or at least 0.05, or at least 0.1, or at least 0.15, or at least 0.2. Additionally, or in the alternative, the DS/AGU of the acetyl groups in a CE can be up to 6, or up to 5, or up to 4, or up to 3.7, or up to 3.5, or up to 3.2, or up to 3.1, or up to 3.04, or up to 3, or up to 2.995, or up to 2.95, or up to 2.9, or up to 2.88, or up to 2.85. Suitable ranges of the DS/AGU of acetyl groups in a CE include greater than 0-6, or greater than 0 to 5, or greater than 0 to 4, or greater than 0 to 3.7, or greater than 0 to 3.5, or greater than 0 to 3.2, or greater than 0 to 3.04, or greater than 0 to 3, or greater than 0 to 2.995, or greater than 0 to 2.95, or greater than 0 to 2.9, or greater than 0 to 2.88, or greater than 0 to 2.85, or 0.05 to 6, or 0.05 to 5, or 0.05 to 4, or 0.05 to 3.7, or 0.05 to 3.5, or 0.05 to 3.2, or 0.05 to 3.1, or 0.05 to 3, or 0.05 to 2.995, or 0.05 to 2.95, or 0.05 to 2.9, or 0.05 to 2.88, or 0.05 to 2.85, or 0.1 to 6, or 0.1 to 5, or 0.1 to 4, or 0.1 to 3.7, or 0.1 to 3.5, or 0.1 to 3.2, or 0.1 to 3.1, or 0.1 to 3, or 0.1 to 2.995, or 0.1 to 2.95, or 0.1 to 2.9, or 0.1 to 2.88, or 0.1 to 2.85, or 0.15 to 6, or 0.15 to 5, or 0.15 to 4, or 0.15 to 3.7, or 0.15 to 3.5, or 0.15 to 3.2, or 0.15 to 3.1, or 0.15 to 3, or 0.15 to 2.995, or 0.15 to 2.95, or 0.15 to 2.9, or 0.15 to 2.88, or 0.15 to 2.85, or 0.2 to 6, or 0.2 to 5, or 0.2 to 4, or 0.2 to 3.7, or 0.2 to 3.5, or 0.2 to 3.2, or 0.2 to 3.1, or 0.2 to 3, or 0.2 to 2.995, or 0.2 to 2.95, or 0.2 to 2.9, or 0.2 to 2.88, or 0.2 to 2.85.

In a CE that is a cellulose acetate (one that is not mixed with any R groups other than acetyl), the amount of acetyl groups by weight percentage can be at least 20, or at least 25, or at least 30, or at least 35, or at least 40 wt %. Additionally, or alternatively, the amount of acetyl groups by weight percentage can be up to 50, or up to 45, or up to 40. Suitable ranges in a cellulose acetate, by wt. %, include 20-50, or 20-45, or 20-40, or 25-50, or 25-45, or 25-40, or 30-50, or 30-45, or 30-40, or 35-50, or 35-45, or 35-40 wt. %. Generally, the weight percentage will be at least 30 or at least 35 and up to 45 or up to 40.

The DS/AGU of the acetyl groups in a cellulose acetate can be at least 1.8, or at least 2, or at least 2.5, or at least 2.7, or at least 2.9, or at least 3, or at least 3.1, or at least 3.2. The cellulose acetate can have a DS/AGU for acetyl groups up to 5, or up to 4, or up to 3.7, or up to 3.5, or up to 3.2, or up to 3.1, or up to 3.04. Suitable ranges of the DS/AGU of acetyl groups in a cellulose acetate include 1.8 to 5, or 1.8 to 4, or 1.8 to 3.7, or 1.8 to 3.5, or 1.8 to 3.2, or 1.8 to 3.1, or 1.8 to 5, or 1.8 to 4, or 1.8 to 3.7, or 1.8 to 3.5, or 1.8 to 3.2, or 1.8 to 3.1, or 2 to 5, or 2 to 4, or 2 to 3.7, or 2 to 3.5, or 2 to 3.2, or 2 to 3.1, or 2.5 to 5, or 2.5 to 4, or 2.5 to 3.7, or 2.5 to 3.5, or 2.5 to 3.2, or 2.5 to 3.1, or 2.7 to 5, or 2.7 to 4, or 2.7 to 3.7, or 2.7 to 3.5, or 2.7 to 3.2, or 2.7 to 3.1, or 2.9 to 5, or 2.9 to 4, or 2.9 to 3.7, or 2.9 to 3.5, or 2.9 to 3.2, or 2.9 to 3.1, or 3 to 5, or 3 to 4, or 3 to 3.7, or 3 to 3.5, or 3 to 3.2, or 3 to 3.1, or 3.1 to 5, or 3.1 to 4, or 3.1 to 3.7, or 3.1 to 3.5, or 3.1 to 3.2, or 3.2 to 5, or 3.2 to 4, or 3.2 to 3.7, or 3.2 to 3.5.

In a mixed CE, the acetyl group content is generally lower than present in cellulose acetates. The weight percentage of acetyl groups (weight of R=2 divided by the weight of the entire CE polymer) in a mixed CE can be from at least 2, or at least 3, or at least 4, or at least 4.5, and up to 25, or up to 20, or up to 15, or up to 10, or up to 8, or up to 6, or up to 5 wt. %. Suitable ranges of the weight % of the acetyl groups ranges from 2 to 25, or 2-20, or 2-15, or 2-10, or 2-8, or 2-6, or 2-5, or 3 to 25, or 3-20, or 3-15, or 3-10, or 3-8, or 3-6, or 3-5, or 4 to 25, or 4-20, or 4-15, or 4-10, or 4-8, or 4-6, or 4-5, or 4.5 to 25, or 4.5-20, or 4.5-15, or 4.5-10, or 4.5-8, or 4.5-6, or 4.5-5 wt. %.

The DS/AGU of the R=2 acetyl groups in a mixed CE can be up to 2.2, or up to 2, or up to 1.5, or up to 1.3, or up to 1.1, or up to 1.05, or up to 1, or up to 0.95 or up to 0.9, or up to 0.85, or up to 0.8, or up to 0.7, or up to 0.6, or up to 0.5, or up to 0.4, or up to 0.35, or up to 0.3, or up to 0.25, or up to 0.2 and in each case is greater than 0, or at least 0.05, or at least 0.1, or at least 0.15, or at least 0.2. The range of DS/AGU of acetyl groups in a mixed CE can be greater than 0-2.2, or greater than 0 to 2, or greater than 0 to 1.3, or greater than 0 to 0.6, or greater than 0 to 0.5, or greater than 0 to 0.4, or greater than 0 to 0.3, or greater than 0 to 0.25, or greater than 0 to 0.2, or 0.05 to 2.2, or 0.05 to 2, or 0.05 to 1.5, or 0.05 to 0.8, or 0.05 to 0.6, or 0.05 to 0.5, or 0.05 to 0.4, or 0.05 to 0.3, or 0.05 to 0.25, or 0.05 to 0.2, or 0.1 to 2.2, or 0.1 to 2, or 0.1 to 1.3, or 0.1 to 0.9, or 0.1 to 0.6, or 0.1 to 0.4, or 0.1 to 0.3, or 0.1 to 0.2, or 0.2 to 2.2, or 0.2 to 2, or 0.2 to 1.5, or 0.2 to 0.9, or 0.2 to 0.6, or 0.2 to 0.4, or 0.2 to 0.35. Generally the DS of acetyl groups in a mixed CE will be toward the lower end of the mentioned ranges, e.g. greater than 0 to 0.5, or greater than 0 to 0.5, or greater than 0 to 0.4, or greater than 0 to 0.3, or greater than 0 to 0.25, or greater than 0 to 0.2, or 0.05 to 0.6, or 0.05 to 0.5, or 0.05 to 0.4, or 0.05 to 0.3, or 0.05 to 0.25, or 0.05 to 0.2, or 0.1 to 0.6, or 0.1 to 0.5, 0.1 to 0.4, or 0.1 to 0.3, or 0.1 to 0.2, or 0.2 to 0.4, or 0.2 to 0.35.

A mixed CE can have propionyl groups, where R=3. The weight percentage of propionyl groups (R=3 divided by the weight of the entire CE polymer) in a mixed CE can be from at least 15, or at least 20, or at least 25, or at least 30, or at least 35, or at least 40, or at least 45, and up to 60, or up to 57, or up to 55, or up to 52. Suitable ranges of the weight % of the propionyl groups ranges from 15 to 60, or 15-57, or 15-55, or 15-52, or 20 to 60, or 20-57, or 20-55, or 20-52, or 20-50, or 20-48, or 20-46, or 25-60, or 25-57, or 25-55, or 25-52, or 25-50, or 25-48, or 25-46, or 30 to 60, or 30-57, or 30-55, or 30-52, or 30-50, or 30-48, or 30-46, or 35 to 60, or 35-57, or 35-55, or 35-52, or 37-50, or 37-48, or 37-46, or 37 to 60, or 37-57, or 37-55, or 37-52, or 37-50, or 37-48, or 37-46, or 39 to 60, or 39-57, or 39-55, or 39-52, or 39-50, or 39-48, or 39-46, or 40 to 60, or 40-57, or 40-55, or 40-52, or 40-50, or 40-48, or 40-46, or 45 to 60, or 45-57, or 45-55, or 45-52 wt. %. Generally the wt. % of the propionyl groups in a mixed CE will be toward the upper end of these ranges, e.g. 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %.

The DS/AGU of the R=3 propionyl groups in a mixed CE can be up to 3.5, or up to 3.3, or up to 3.2, or up to 3, or up to 2.95, or up to 2.9, or up to 1.1, or up to 1.05, or up to 1, or up to 0.95 or up to 0.9, or up to 0.85, or up to 0.8, or up to 0.7, or up to 0.6, or up to 0.5, or up to 0.4, or up to 0.35, or up to 0.3, or up to 0.25, or up 2.85, or up to 2.8, or up to 2.75, or up to 2.6, or up to 2.5, or up to 2.45, or up to 2.4, or up to 2.35, or up to 2.3. The DS/AGU of the propionyl groups can be zero, or at least 0.6, or at least 0.7, or at least 1, or at least 1.5, or at least 1.7, or at least 1.8, or at least 1.9, or at least 2, or at least 2.3, or at least 2.4, or at least 2.5, or at least 2.6, or at least 2.65, or at least 2.7. The range of DS/AGU of propionyl groups in a mixed CE can 0 to 3.5, or 0 to 3.3, or 0 to 3.2, or 0 to 3, or 0 to 2.95, or 0 to 2.9, or 0, to 2.85, or 0 to 2.8, or 0 to 2.75, or 0 to 2.6, or 0 to 2.5, or up to 2.45, or up to 2.4, or up to 2.35, or up to 2.3, or 0.6 to 3.5, or 0.6 to 3.3, or 0.6 to 3.2, or 0.6 to 3, or 0.6 to 2.95, or 0.6 to 2.9, or 0.6, to 2.85, or 0.6 to 2.8, or 0.6 to 2.75, or 0.6 to 2.6, or 0.6 to 2.5, or 0.6 to 2.45, or 0.6 to 2.4, or 0.6 to 2.35, or 0.6 to 2.3, or 0.7 to 3.5, or 0.7 to 3.3, or 0.7 to 3.2, or 0.7 to 3, or 0.7 to 2.95, or 0.7 to 2.9, or 0.7 to 2.85, or 0.7 to 2.8, or 0.7 to 2.6, or 0.7 to 2.5, or 0.7 to 2.45, or 0.7 to 2.4, or 0.7 to 2.35, or 0.7 to 2.3, or 0.8 to 3.5, or 0.8 to 3.3, or 0.8 to 2.7, or 1 to 3.5, or 1 to 3.3, or 1 to 3.2, or 1 to 3, or 1 to 2.95, or 1 to 2.9, or 1 to 2.85, or 1 to 2.8, or 1 to 2.75, or 1.5 to 3.5, or 1.5 to 3.3, or 1.5 to 3.2, or 1.5 to 3, or 1.5 to 2.95, or 1.5 to 2.9, or 1.5, to 2.85, or 1.5 to 2.8, or 1.5 to 2.75, or 1.7 to 2.6, or 1.7 to 2.5, or 1.7 to 2.45, or 1.7 to 2.4, or 1.7 to 2.35, or 1.7 to 2.3, or 1.8 to 3, or 1.8 to 2.95, or 1.8 to 2.9, or 1.8, to 2.85, or 1.8 to 2.8, or 1.8 to 2.75, or 1.8 to 2.6, or 1.8 to 2.5, or 1.8 to 2.45, or 1.8 to 2.4, or 1.8 to 2.35, or 1.8 to 2.3, or 1.9 to 3, or 1.9 to 2.95, or 1.9 to 2.9, or 1.9, to 2.85, or 1.9 to 2.8, or 1.9 to 2.75, or 1.9 to 2.6, or 1.9 to 2.5, or 1.9 to 2.45, or 1.9 to 2.4, or 1.9 to 2.35, or 1.9 to 2.3, or 2 to 3.5, or 2 to 3.3, or 2 to 3.2, or 2 to 3, or 2 to 2.95, or 2 to 2.9, or 2 to 2.85, or 2 to 2.8, or 2 to 2.75, or 2 to 2.6, or 2 to 2.5, or 2 to 2.45, or 2 to 2.4, or 2 to 2.35, or 2 to 2.3, or 2.3 to 3.5, or 2.3 to 3.3, or 2.3 to 3.2, or 2.3 to 3, or 2.3 to 2.95, or 2.3 to 2.9, or 2.3 to 2.85, or 2.3 to 2.8, or 2.3 to 2.75, or 2.3 to 2.6, or 2.3 to 2.5, or 2.3 to 2.45, or 2.5 to 3.5, or 2.5 to 3.3, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.5, or 2.6 to 3.3, or 2.6 to 3.2, or 2.6 to 3, or 2.6 to 2.95, or 2.6 to 2.9, or 2.6 to 2.85, or 2.6 to 2.8, or 2.6 to 2.75. Generally, the flexibility and compatibility of the CE with the poly(vinyl acetal) resin will improve as the propionyl DS/AGU increases. Desirably, the DS of propionyl groups in a mixed CE will toward the upper end of the mentioned ranges, e.g. 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.2, or 2.6 to 3, or 2.6 to 2.95, or 2.6 to 2.9, or 2.6 to 2.85, or 2.6 to 2.8, or 2.6 to 2.75.

A mixed CE can have butyryl groups, where R=4. The weight percentage of propionyl groups (R=4 divided by the weight of the entire CE polymer) in a mixed CE can be from at least 15, or at least 20, or at least 25, or at least 30, or at least 35, or at least 40, or at least 45, and up to 60, or up to 57, or up to 55, or up to 52. Suitable ranges of the weight % of the butyryl groups ranges from 15 to 60, or 15-57, or 15-55, or 15-52, or 20 to 60, or 20-57, or 20-55, or 20-52, or 25-60, or 25-57, or 25-55, or 25-52, or 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %. Generally, the weight % of the butyryl groups in a mixed CE will be toward the upper end of these ranges, e.g. 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %.

The DS/AGU of the R=4 butyryl groups in a mixed CE can be up to 3.2, or up to 3, or up to 2.95, or up to 2.9, or up to 1.1, or up to 1.05, or up to 1, or up to 0.95 or up to 0.9, or up to 0.85, or up to 0.8, or up to 0.7, or up to 0.6, or up to 0.5, or up to 0.4, or up to 0.35, or up to 0.3, or up to 0.25, or up 2.85, or up to 2.8, or up to 2.75. The DS of the butyryl groups can be at least 0.6, or at least 0.7, or at least 1, or at least 1.5, or at least 2, or at least 2.3, or at least 2.4, or at least 2.5, or at least 2.6, or at least 2.65, or at least 2.7. The range of DS/AGU of acetyl groups in a mixed CE can 0-3.2, or 0-3, or 0-2.95, or 0-2.9, or 0-2.85, or 0-2.8, or 0-2.7, or 0.6 to 3.2, or 0.6 to 3, or 0.6 to 2.95, or 0.6 to 2.9, or 0.6, to 2.85, or 0.6 to 2.8, or 0.6 to 2.75, or 0.7 to 3.2, or 0.7 to 3, or 0.7 to 2.95, or 0.7 to 2.9, or 0.7 to 2.85, or 0.7 to 2.8, or 0.7 to 2.7, 1 to 3.2, or 1 to 3, or 1 to 2.95, or 1 to 2.9, or 1 to 2.85, or 1 to 2.8, or 1 to 2.75, or 1.5 to 3.2, or 1.5 to 3, or 1.5 to 2.95, or 1.5 to 2.9, or 1.5, to 2.85, or 1.5 to 2.8, or 1.5 to 2.75, or 2 to 3.2, or 2 to 3, or 2 to 2.95, or 2 to 2.9, or 2 to 2.85, or 2 to 2.8, or 2 to 2.75, or 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.2, or 2.6 to 3, or 2.6 to 2.95, or 2.6 to 2.9, or 2.6 to 2.85, or 2.6 to 2.8, or 2.6 to 2.75. Generally, the flexibility and compatibility of the CE with the poly(vinyl acetal) resin will improve as the butyryl DS/AGU increases. Desirably, the DS/AGU of butyryl groups will toward the upper end of the mentioned ranges, e.g. 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.2, or 2.6 to 3, or 2.6 to 2.95, or 2.6 to 2.9, or 2.6 to 2.85, or 2.6 to 2.8, or 2.6 to 2.75.

The CEs useful in the present invention can have a number average molecular weight ($M_n$) of at least about 12,000, or at least 15,000, or at least 20,000, or at least 25,000, or at least 30,000, or at least 35,000, or at least 40,000, or at least 45,000, or at least 50,000, or at least about 55,000, or at least about 60,000, or at least about 65,000, or at least about 70,000 and in each case up to about 120,000, or up to about 100,000, or up to about 85,000. The Mn values are polystyrene-equivalent molecular weights determined using size exclusion chromatography. Suitable Mn ranges include 12,000-120,000, or 12,000-100,000, or 12,000-85,000, or 15,000-120,000, or 15,000-100,000, or 15,000-85,000, or 20,000-120,000, or 20,000-100,000, or 20,000-85,000, or 25,000-120,000, or 25,000-100,000, or 25,000-85,000, or 30,000-120,000, or 30,000-100,000, or 30,000-85,000, or 35,000-120,000, or 35,000-100,000, or 35,000-85,000, or 40,000-120,000, or 40,000-100,000, or 40,000-85,000, or 45,000-120,000, or 45,000-100,000, or 45,000-85,000, or 50,000-120,000, or 50,000-100,000, or 50,000-85,000, or 55,000-120,000, or 55,000-100,000, or 55,000-85,000, or 60,000-120,000, or 60,000-100,000, or 60,000-85,000.

Desirably, the CE employed is at a higher molecular weight to improve the toughness, flexibility, and impact strength of the CE resin. Accordingly, CE's that have molecular weights of at least 40,000, or even at least 50,000, and at least 60,000, and in each case up to 120,000 or up to 100,000 or up to 85,000 are desirable to obtain one or more of these properties.

The CEs can have a glass transition temperature ("Tg") of at least about 55° C., or at least about 60° C., or at least about 70° C., or at least about 75° C., or at least about 80° C., or at least about 85° C., or at least about 90° C., or at least about 95° C., or at least about 100° C., or at least about 110° C., or at least about 120° C., or at least about 130° C., or at least 140° C., and up to 220° C., or up to 210° C., or up to 200° C., or up to 190° C., or up to 180° C. The Tg of the CE resin is determined by a different method than the Tg of the poly(vinyl acetal) resin. The Tg of the CE resin is determined by differential scanning calorimetry at 10° C./minute scan rate, second heat scan, at the mid-point of the glass transition. Suitable ranges of Tg by ° C. include 55-220, or 55-210, or 55-200, or 55-190, or 55-180, or 55-180, or 65-220, or 65-210, or 65-200, or 65-190, or 65-180, or 85-220, or 85-210, or 85-200, or 85-190, or 85-180, 100-220, or 100-210, or 100-200, or 100-190, or 100-180, or 110-220, or 110-210, or 110-200, or 110-190, or 110-180, or 120-220, or 120-210, or 120-200, or 120-190, or 120-180, or 130-220, or 130-210, or 130-200, or 130-190, or 130-180, or 140-220, or 140-210, or 140-200, or 140-190, or 140-180.

Desirable ranges of Tg to give the CE resin stiffness and rigidity are those having a Tg of at least 100° C., or at least 110° C., or at least 120° C., or at least 130° C.

The degree of polymerization ("DP") as used herein refers to the number of AGUs per molecule of CE. The DP is not particularly limited, although it is desirable to employ CEs having a combination of hydroxyl content and sufficiently high molecular weight to be film forming. In one embodiment of the invention, the CEs can have a DP of at least about 110, or at least about 120, or at least about 130, or at least about 140, or at least about 150, or at least about 160, or at least about 170, or at least about 180, or at least about 190, or at least about 200, or at least about 210, or at least about 220, or at least about 230, or at least about 240, and up to about 350, or up to about 325, or up to about 300.

The CEs can have a falling ball viscosity of at least about 0.005, or at least 0.01, or at least 0.05, or at least 0.1, or at least 0.5, or at least 1, or at least 1.5, or at least 2, or at least 4, or at least 5, or at least 7, or at least 10, or at least 12, or at least 15, and up to 50, or up to 45, or up to 40, or up to 35, or up to 30, or up to 25 pascals-second ("Pa·s") as measured by ASTM D817, Formula A. Suitable ranges of viscosity include 0.005 to 50, or 0.005 to 35, or 0.01 to 50, or 0.01 to 35, or 0.01 to 30, or 0.01 to 25, or 0.01 to 20, or 0.01 to 15, or 0.01 to 10, or 0.01 to 7, or 0.01 to 6, or 0.01 to 5, or 0.01 to 4, or 0.01 to 3, or 0.01 to 2, or 0.01 to 1, or 0.2 to 50, or 0.2 to 35, or 0.2 to 30, or 0.2 to 25, or 0.2 to 25, or 0.2 to 20, or 0.2 to 15, or 0.2 to 10, or 0.2 to 7, or 0.2 to 6, or 0.2 to 5, or 0.2 to 4, or 0.2 to 3, or 0.2 to 2, or 0.2 to 1, or 1.5 to 50, or 1.5 to 40, or 1.5 to 35, or 1.5 to 30, or 1.5 to 25, or 1.5 to 20, or 1.5 to 15, or 1.5 to 10, or 1.5 to 7, or 1.5 to 6, or 1.5 to 5, or 1.5 to 4, or 1.5 to 3, or 1.5 to 2, or 2 to 50, or 2 to 35, or 2 to 30, or 2 to 25, or 2 to 25, or 2 to 20, or 2 to 15, or 2 to 10, or 2 to 7, or 2 to 6, or 2 to 5, or 2 to 4, or 2 to 3, or 4 to 50, or 4 to 35, or 4 to 30, or 4 to 25, or 4 to 25, or 4 to 20, or 4 to 15, or 4 to 10, or 4 to 7, or 4 to 6, or 4 to 5, or 5 to 50, or 5 to 35, or 5 to 30, or 5 to 25, or 5 to 25, or 5 to 20, or 5 to 15, or 5 to 10, or 5 to 7, or 5 to 6, or 10 to 50, or 10 to 45, or 10 to 40, or 10 to 35, or 10 to 30, or 10 to 25, or 10 to 25, or 10 to 20, or 10 to 15, or 12 to 50, or 12 to 45, or 12 to 40, or 12 to 35, or 12 to 30, or 12 to 30, or 12 to 25, or 12 to 25, or 12 to 20, or 12 to 15, or 15 to 50, or 15 to 45, or 15 to 40, or 15 to 35 or 15 to 30, or 15 to 25 or 15 to 25, or 15 to 20.

The CEs desirably have not previously been subjected to fibrillation or any other fiber-producing process. The CEs are not in the form of fibrils and can be referred to as "non-fibril."

The CE resin desirably has a storage E' modulus, of at least 200,000,000 pascals, or at least 300,000,000 pascals, or at least 400,000,000 pascals, or at least 500,000,000 pascals, or at least 600,000,000 pascals, or at least 700,000,000 pascals, or at least 800,000,000 pascals, or at least 900,000,000 pascals, or at least 1,000,000,000 pascals. There is no particular upper limit, although practically the CE resins or a one or more core layers of the monolithic interlayer can obtain a storage E' modulus as high as 3,000,000,000 pascals, or as high as 2,000,000,000.

The CEs can be produced by any method known in the art. Examples of processes for producing CEs are taught in Kirk-Othmer, Encyclopedia of Chemical Technology, 5th Edition, Vol. 5, Wiley-Interscience, New York (2004), pp. 394-444. Cellulose, the starting material for producing CEs, can be obtained in different grades and from sources such as, for example, cotton linters, softwood pulp, hardwood pulp, corn fiber and other agricultural sources, and bacterial celluloses.

One method of producing CEs is by esterification. In such a method, the cellulose is mixed with the appropriate organic acids, acid anhydrides, and catalysts and then converted to a cellulose triester. Ester hydrolysis is then performed by adding a water-acid mixture to the cellulose triester, which can be filtered to remove any gel particles or fibers. Water is added to the mixture to precipitate out the CE. The CE can be washed with water to remove reaction by-products followed by dewatering and drying.

The cellulose triesters that are hydrolyzed can have three substituents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate and cellulose acetate butyrate. These cellulose triesters can be prepared by a number of methods known to those skilled in the art. For example, cellulose triesters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses CEs that are not completely substituted with acyl groups. For example, cellulose triacetate commercially available from Eastman Chemical Company, Inc., Kingsport, Tenn., U.S.A., typically has a DS from about 2.85 to about 2.95.

After esterification of the cellulose to the triester, part of the acyl substituents can be removed by hydrolysis or by alcoholysis to give a secondary CE. Secondary CEs can also be prepared directly with no hydrolysis by using a limiting amount of acylating reagent. This process is particularly useful when the reaction is conducted in a solvent that will dissolve cellulose.

The polydispersity of the CE is not particularly limited. The polydispersity can be range from 1 to 4, or 1 to 3.7, or from 1.1 to 3.7, or from 1.2 to 3.5, or from 1.2 to 3.3.

Additional examples of suitable CE's that can be used in the CE resin are as set forth in Table 2.

TABLE 2

| Example | Total DS/AGU | OH wt. % | Acetyl DS/AGU | Propionyl DS/AGU or Butyryl DS/AGU | Mn x1000 | Tg ° C. | Falling Ball Viscosity |
|---------|--------------|----------|---------------|-----------------------------------|----------|---------|------------------------|
| 1  | 1.5-6     | 0.5-6   | >0-6      | 0-3.5    | 12-120 | 85-220  | 0.005-50 |
| 2  | 2-4       | 0.5-5   | 0.05-3.5  | 0-3.5    | 12-85  | 85-200  | 0.01-40  |
| 3  | 2-3.1     | 0.5-3   | 0.05 to 1 | 1.5-2.95 | 15-100 | 110-210 | 0.01-40  |
| 4  | 2-3       | 0.5-2   | 0.1-1     | 1.5-2.90 | 15-85  | 110-190 | 0.01-40  |
| 5  | 2.4-2.995 | 0.7-6   | >0-0.6    | 2.3-2.95 | 15-85  | 110-190 | 4-50     |
| 6  | 2.4-3     | 0.7-6   | >0-0.6    | 2.3-2.95 | 20-120 | 120-190 | 4-50     |
| 7  | 2.4-2.995 | 0.7-5   | 0.1-0.3   | 2.3-2.85 | 20-85  | 120-190 | 5-40     |
| 8  | 2.4-3     | 0.7-3   | >0-0.4    | 2.3-2.95 | 30-100 | 130-190 | 5-40     |
| 9  | 2.4-2.995 | 0.7-3   | 0.1-0.3   | 2.3-2.95 | 30-85  | 130-180 | 5-40     |
| 10 | 2.5-3     | 0.7-6   | >0-0.4    | 2.3-2.95 | 40-120 | 120-180 | 10-40    |
| 11 | 2.5-2.995 | 0.7-5   | >0-0.3    | 2.3-2.95 | 40-100 | 130-180 | 10-35    |
| 12 | 2.5-2.95  | 0.7-2.3 | >0-0.4    | 2.3-2.9  | 40-85  | 130-190 | 10-40    |
| 13 | 2.6-3.3   | 0.7-6   | 2.6-3.3   | 0        | 12-85  | 120-200 | 5-50     |
| 14 | 2.6-3.1   | 0.7-5   | >0-0.4    | 2.3-2.95 | 12-100 | 120-190 | 10-40    |
| 15 | 2.6-3     | 0.7-5   | >0-0.4    | 2.3-2.95 | 50-85  | 130-190 | 12-35    |
| 16 | 2.6-2.995 | 0.7-3   | >0-0.4    | 2.3-2.95 | 50-85  | 130-190 | 12-35    |
| 17 | 2.6-2.95  | 0.7-3   | 0.1-0.3   | 2.3-2.85 | 50-85  | 130-190 | 12-35    |
| 18 | 2.7-3.0   | 0.7-6   | 0.1-0.5   | 2.3-2.9  | 30-120 | 120-200 | 5-50     |
| 19 | 2.7-3.3   | 0.7-6   | 0.1-3.3   | 0-2.95   | 12-100 | 120-190 | 5-40     |
| 20 | 2.7-3.0   | 0.7-5   | >0-0.4    | 2.3-2.95 | 30-100 | 130-190 | 5-40     |
| 21 | 2.7-3     | 0.7-3   | 0.1-0.3   | 2.3-2.95 | 50-100 | 130-190 | 5-40     |
| 22 | 2.7-2.995 | 0.7-2   | >0-0.4    | 2.3-2.95 | 50-85  | 140-190 | 10-35    |
| 23 | 2.7-2.95  | 0.7-3   | 0.1-0.3   | 2.3-2.85 | 60-85  | 140-180 | 12-35    |
| 24 | 2.6-3     | 0.7-3   | >0-0.4    | 2.3-2.95 | 60-85  | 130-190 | 5-40     |

Yet further example of suitable CEs include:

A. a CE having a total DS/AGU of at least 2.5, an OH wt. % of not more than 4 wt. %, a propionyl or butyryl DS/AGU from 2.3-3, and an acetyl DS/AGU from about 0.05 to 0.4; a number average molecular weight of from about 30,000 to about 100,000; and a Tg of at least 80; or B. a CE having a total DS/AGU of at least 2.5, a propionyl DS/AGU from 2.5-2.95, an acetyl DS/AGU from 0.05 to 0.4, and Mn of 40,000 to 85,000;

C. a CE having a total DS/AGU of at least 2.5; a propionyl or butyryl DS/AGU from 1.8-2.5 or from 1.8 to 2.35; an acetyl DS/AGU of up to 0.35, or up to 0.25, or up to 0.2; and an OH wt. % of 3-6; or D. a CE having acetyl groups in an amount of less than 4 wt. %, propionyl or butyryl groups in an amount of 39-46 wt. %, and OH groups in an amount of 3-6 wt. %.

Plasticizer

The poly(vinyl acetal) resin and/or the CE resin can be modified using one or more plasticizers. As used herein, the amount of plasticizer, or any other component in the monolithic interlayer, can be measured as parts per hundred parts resin (phr), on a weight per weight basis. For example, if 30 grams of plasticizer is added to 100 grams of a poly(vinyl acetal) resin, then the plasticizer content of the resulting plasticized poly(vinyl acetal) would be 30 phr. As used herein, when the plasticizer content of the monolithic interlayer is given, the plasticizer content is determined with reference to the phr of the plasticizer in the monolithic interlayer, which takes into account the amount of plasticizer in both the poly(vinyl acetal) and CE resins.

The poly(vinyl acetal) resin(s) can contain at least 15, or at least 17, or at least 20, or at least 23, or at least 25, or at least 27, or at least 30, or at least 32, or at least 35 phr plasticizer, and up to 80, or up to 70, or up to 60, or up to 50, or up to 45, or up to 40, or up to 35, or up to 30 phr plasticizer based on the weight of the poly(vinyl acetal) resin. Suitable ranges of plasticizer in phr within a poly (vinyl acetal) resin include 15 to 80, or 15 to 70, or 15 to 60, or 15 to 50, or 15 to 45, or 15 to 40, or 15 to 35, or 15 to 30, 20 to 80, or 20 to 70, or 20 to 60, or 20 to 50, or 20 to 45, or 20 to 40, or 20 to 35, or 20 to 30, 25 to 80, or 25 to 70, or 25 to 60, or 25 to 50, or 25 to 45, or 25 to 40, or 25 to 35, or 25 to 30, 30 to 80, or 30 to 70, or 30 to 60, or 30 to 50, or 30 to 45, or 30 to 40, or 30 to 35, or 35 to 30, 35 to 80, or 35 to 70, or 35 to 60, or 35 to 50, or 35 to 45, or 35 to 40 phr plasticizer.

The CE resin(s) can contain at least 2, or at least 5, or at least 8, or at least 10, or at least 13, or at least 15, or at least 18, or at least 20 wt. % plasticizer, and up to 100, or up to 80, or up to 70, or up to 60, or up to 50, or up to 40, or up to 30, or up to 25, or up 20 wt. % plasticizer, based on the weight of the CE resin. Suitable ranges of plasticizer in wt. % within a CE resin or any one or more of the skin layers include 2 to 100, or 2 to 80, or 2 to 70, or 2 to 60, or 2 to 50, or 2 to 40, or 2 to 30, or 2 to 25, or 2 to 20, or 5 to 100, or 5 to 80, or 5 to 70, or 5 to 60, or 5 to 50, or 5 to 40, or 5 to 30, or 5 to 25, or 5 to 20, or 8 to 100, or 8 to 80, or 8 to 70, or 8 to 60, or 8 to 50, or 8 to 40, or 8 to 30, or 8 to 25, or 8 to 20, 10 to 100, or 10 to 80, or 10 to 70, or 10 to 60, or 10 to 50, or 10 to 40, or 10 to 30, or 10 to 25, or 10 to 20, or 15 to 100, or 15 to 80, or 15 to 70, or 15 to 60, or 15 to 50, or 15 to 40, or 15 to 30, or 15 to 25, or 15 to 20 wt. % plasticizer.

One of the advantages of the CE resin is that it can tolerate high loadings of plasticizer while maintaining acceptable stiffness/modulus, that is, a storage E' modulus that is higher than the storage E' modulus of the poly(vinyl acetal) resin used to make the polymer blend (e.g. at least 10%, or at least 15%, or at least 20%, or at least 30%, or at least 40% higher). Thus, high amounts of plasticizer in the CE resin described above is tolerable because the stiffness/modulus of CE resin will not drop below stiffness/modulus of the poly(vinyl acetal) resins used in the polymer blend. Further, since the CE resin and poly(vinyl acetal) are blended, a PVAC can now be formulated with less plasticizer. So, if desired, the amount of plasticize employed in poly(vinyl acetal) resin can be at the lower end of the aforementioned ranges since the plasticizer present in the CE will provide the necessary plasticizing effect to the monolithic layer.

Accordingly, the monolithic interlayer can made by blending a poly(vinyl acetal) resin and a CE resin, wherein the CE resin contains a higher wt. % of plasticizer than does the poly(vinyl acetal) resin used to make the polymer blend.

The type of plasticizer used in the poly(vinyl acetal) resin or the CE is not particularly limited, and can be the same or different. The plasticizer used for modification can be any that is known in the art that can reduce the melt temperature and/or the melt viscosity of the poly(vinyl acetal) and/or CE. The plasticizer can be either monomeric or polymeric in structure.

The plasticizer can be compound having a hydrocarbon segment of 30 or less, or 25 or less, or 20 or less, or 15 or less, or 12 or less, or 10 or less carbon atoms, and in each case at least 6 carbon atoms. Suitable conventional plasticizers for use in these interlayers include esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. A desirable plasticizer is 3GEH.

Additionally, other plasticizers, such as high refractive index plasticizers, may also be used in the monolithic interlayer, either alone or in combination with another plasticizer. Examples of the high refractive index plasticizers include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. Examples of more preferred high refractive index plasticizers are dipropylene glycol dibenzoates and tripropylene glycol dibenzoates.

Other useful plasticizers are triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

The plasticizer can be one or more esters comprising (i) at least one acid residue including residues of phthalic acid, adipic acid, trimellitic acid, succinic acid, benzoic acid, azelaic acid, terephthalic acid, isophthalic acid, butyric acid, glutaric acid, citric acid, and/or phosphoric acid; and (ii) alcohol residues comprising one or more residues of an aliphatic, cycloaliphatic, or aromatic alcohol containing up to about 20 carbon atoms.

The plasticizer can comprise alcohol residues containing residues selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

The plasticizer can be selected from at least one of the following: benzoates, phthalates, phosphates, arylene-bis (diaryl phosphate), and isophthalates. In another embodiment, the plasticizer comprises diethylene glycol dibenzoate, abbreviated herein as "DEGDB".

The plasticizer can comprise aliphatic polyesters containing C2-10 diacid residues such as, for example, malonic acid, succinic acid, glutaric acid, adipic acid, pimelic acid, suberic acid, azelaic acid, and sebacic acid; and C2-10 diol residues.

The plasticizer can comprise diol residues which can be residues of at least one of the following C2-C10 diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

The plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight of the polyglycol can range from about 200 to about 2,000.

The plasticizer can comprise at least one of the following: Resoflex® R296 plasticizer, Resoflex® 804 plasticizer, SHP (sorbitol hexapropionate), XPP (xylitol pentapropionate), XPA (xylitol pentaacetate), GPP (glucose pentaacetate), GPA (glucose pentapropionate), and APP (arabitol pentapropionate).

The plasticizer can comprise one or more of from about 5 to about 95 weight percent of a C2-C12 carbohydrate organic ester, wherein the carbohydrate comprises from about 1 to about 3 monosaccharide units; and from about 5 to about 95 weight percent of a C2-C12 polyol ester, wherein the polyol is derived from a C5 or C6 carbohydrate. In one embodiment, the polyol ester does not comprise or contain a polyol acetate or polyol acetates.

The plasticizer can comprise at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose, and raffinose.

The plasticizer can comprise at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate, and β-glucose pentabutyrate.

The plasticizer can comprise at least one carbohydrate ester and the carbohydrate portion of the carbohydrate ester comprises an α-anomer, a β-anomer, or a mixture thereof.

Compatibilizers

The monolithic interlayer can be modified using one or more compatibilizers. The compatibilizer can comprise at least about 1, 2, 3, or 5 weight percent of the monolithic interlayer composition. Additionally or alternatively, the compatibilizer can comprise not more than about 40, 30, 25, 20, 15, 10, or 8 weight percent of the monolithic interlayer composition. Suitable ranges include, in weight percent based on the weight of the monolithic interlayer composition, 1-40, or 2-40, or 3-40, or 5-40, or 1-30, or 2-30, or 3-30, or 5-30, or 1-25, or 2-25, or 3-25, or 5-25, or 1-20, or 2-20, or 3-20, or 5-20, or 1-15, or 2-15, or 3-15, or 5-15, or 1-10, or 2-10, or 3-10, or 5-10, or 1-8, or 2-8, or 3-8, or 5-8.

When non-reactive compatibilizers are utilized, the compatibilizer can contain a first segment that is compatible with the CE and a second segment that is compatible with the poly(vinyl acetal) in the polymer blend. In this case, the first segment contains polar functional groups, which provide compatibility with the CE, including, but not limited to, such polar functional groups as ethers, esters, amides, alcohols, amines, ketones, and acetals. The first segment may include oligomers or polymers of the following: CEs; cellulose ethers; polyoxyalkylene, such as, polyoxyethylene, polyoxypropylene, and polyoxybutylene; polyglycols, such as, polyethylene glycol, polypropylene glycol, and polybutylene glycol; polyesters, such as, polycaprolactone, polylactic acid, aliphatic polyesters, and aliphatic-aromatic copolyesters; polyacrylates and polymethacrylates; polyacetals; polyvinylpyrrolidone; polyvinyl acetate; and polyvinyl alcohol. In one embodiment, the first segment is polyoxyethylene or polyvinyl alcohol.

The second segment can be compatible with the poly(vinyl acetal) and contain nonpolar groups. The second segment can contain saturated and/or unsaturated hydrocarbon groups. In one embodiment, the second segment can be an oligomer or a polymer. In another embodiment, the second segment of the non-reactive compatibilizer is selected from the group consisting of polyolefins, polydienes, polyaromatics, and copolymers.

In one embodiment, the first and second segments of the non-reactive compatibilizers can be in a diblock, triblock, branched, or comb structure. In this embodiment, the molecular weight of the non-reactive compatibilizers can range from about 300 to about 20,000, 500 to about 10,000, or 1,000 to about 5,000. The segment ratio of the non-reactive compatibilizers can range from about 15 to about 85 percent polar first segments to about 15 to about 85 percent nonpolar second segments.

Examples of non-reactive compatibilizers include, but are not limited to, ethoxylated alcohols, ethoxylated alkylphenols, ethoxylated fatty acids, block polymers of propylene oxide and ethylene oxide, polyglycerol esters, polysaccharide esters, and sorbitan esters. Examples of ethoxylated alcohols are C11-C15 secondary alcohol ethoxylates, polyoxyethylene cetyl ether, polyoxyethylene stearyl ether, and C12-C14 natural liner alcohol ethoxylated with ethylene oxide. C11-C15 secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. C12-C14 natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids include polyethyleneglycol monostearate or monolaurate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

The compatibilizer can be reactive. The reactive compatibilizer comprises a polymer or oligomer compatible with one component of the composition and functionality capable of reacting with another component of the composition. There are two types of reactive compatibilizers. The first reactive compatibilizer has a hydrocarbon chain that is compatible with nonpolar segments of the poly(vinyl acetal) and also has functionality capable of reacting with the CE. Such functional groups include, but are not limited to, carboxylic acids, anhydrides, acid chlorides, epoxides, and isocyanates. Specific examples of this type of reactive compatibilizer include, but are not limited to: long chain fatty acids, such as stearic acid (octadecanoic acid); long chain fatty acid chlorides, such as stearoyl chloride (octadecanoyl chloride); long chain fatty acid anhydrides, such as stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, such as terpolymers of ethylene, acrylic ester and maleic anhydride; and copolymers of glycidyl methacrylate with olefins and/or acrylic esters, such as terpolymers of ethylene, acrylic ester, and glycidyl methacrylate.

Reactive compatibilizers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

ACA

In addition to the use of a plasticizer as described above, various adhesion control agents ("ACAs") can be used in the monolithic interlayer composition. ACAs in the monolithic interlayer formulation control adhesion of the interlayer to glass to provide energy absorption on impact of the glass laminate. In various embodiments of interlayers of the present disclosure, the interlayer can comprise about 0.003 to about 0.15 parts ACAs per 100 parts polymer blend; about 0.01 to about 0.10 parts ACAs per 100 parts polymer blend; and about 0.01 to about 0.04 parts ACAs per 100 parts polymer blend, the polymer blend being poly(vinyl acetal) and CE. Such ACAs, include, but are not limited to, the ACAs disclosed in U.S. Pat. No. 5,728,472 (the entire disclosure of which is incorporated herein by reference), residual sodium acetate, potassium acetate, magnesium bis (2-ethyl butyrate), and/or magnesium bis(2-ethylhexanoate).

Blending Method

The monolithic interlayer comprising the polymer blend of the present invention can be produced by two different types of processes. The first process involves directly melt dispersing the CE and poly(vinyl acetal) resin. The second process involves mixing a CE with a carrier poly(vinyl acetal) resin to produce a CE concentrate having a higher concentration that in a monolithic interlayer composition, and then blending the CE concentrate with a poly(vinyl acetal) resin to make the monolithic interlayer composition.

In the first process, CE is blended directly with a poly (vinyl acetal) resin to produce a polymer blend composition that is either a molten polymer blend or a solid polymer blend. The first process comprises combining at least one solid poly(vinyl acetal) resin, at least one solid CE, and, optionally, one or more additives such as ACA's compatibilizers, UV stabilizers, or any other additive mentioned above, to make a solid/solid blend, mixing the solid/solid blend, followed by heating the solid/solid blend for a sufficient time and at a temperature to make a molten polymer blend or a softened polymer blend. In a second process comprises melting a solid poly(vinyl acetal) resin, melting or softening a CE resin, followed by combining and mixing the molten poly(vinyl acetal) resin with the melted or softened CE resin for a time and a temperature sufficient to make a molten blend. As used throughout, a molten blend can have solid or softened particulates so long as at least a molten phase is present. A sufficient temperature for blending the CE and the poly(vinyl acetal) resin can be the flow temperature of the CE, which is higher than the Tg of the CE by at least about 10° C., 15° C., 20° C., 25° C., 30° C., 35° C., 40° C., 45° C., or 50° C. The temperature of the blending can be limited by the poly(vinyl acetal) resin's upper processing temperature range and the lower processing temperature range of the CE.

The poly(vinyl acetal) resin, CE, fillers, and additives can be added or combined in any order during the process. Solid poly(vinyl acetal) particles and solid CE particles can be combined and together fed as a single stream to a melt tank and melted, optionally under mechanical agitation or shear, the melt then fed to an extrusion device. Alternatively, the combined poly(vinyl acetal) and CE particles can be fed as a single stream into an extrusion device. In another method, the poly(vinyl acetal) and CE particles can be fed as individual streams to an extrusion device. The poly(vinyl acetal) and/or CE can be modified with a plasticizer and/or compatibilizer prior to being blended together.

At least a portion of the melt blending can occur at a temperature of at least the minimum temperature of the highest melting CE or poly(vinyl acetal) polymer. A sufficient temperature for mixing the CE and the poly(vinyl acetal) resin can be the flow temperature of the CE, which is within 10° C., 15° C., 20° C., 25° C., 30° C., 35° C., 40° C., 45° C., or 50° C. above the Tg of the CE. At least a portion of the melt temperature, optionally under shear, can occur at a temperature of at least about 100° C., or at least 120° C., or at least 140° C., or at least 150° C., or at least 160° C., or at least 180° C., or at least 200° C., or at least 220° C., or at least 230° C., or at least 235° C., or at least 240° C. and up to 280° C., or up to 260° C., or up to 255° C., or up to 250° C., or up to 245° C., or up to 240° C., or up to 230° C., or up to 220° C., or up to 210° C. The set temperature of a die through which the molten polymer blend flows is desirably at least 170° C., or at least 180° C., and up to 245° C., or up to 240° C., or 230° C., or up to 220° C.

During this first process, the CEs can effectively soften and/or melt, thus allowing the CEs to form into sufficiently small particle sizes under the specified blending conditions. In such an embodiment, due to the small particle sizes, the CEs can be thoroughly dispersed throughout the poly(vinyl acetal) resin during the process. In one embodiment, the domains of the CE in the interlayer have a spherical or near-spherical shape. As used herein, a "near-spherical" shape is understood to include particles having a cross-sectional aspect ratio of less than 2:1. In more particular embodiments, the spherical and near-spherical domains have a cross-sectional aspect ratio of less than 1.5:1, 1.2:1, or 1.1:1. The "cross-sectional aspect ratio" as used herein is the ratio of the longest dimension of the particle's cross-section relative to its shortest dimension. In a further embodiment, at least about 75, 80, 85, 90, 95, or 99.9 percent of the domains of CEs in the polymer blend have a cross-sectional aspect ratio of not more than about 10:1, 8:1, 6:1, or 4:1.

At least about 75, 80, 85, 90, 95, or 99.9 percent of the CE can have a diameter of not more than about 10, 8, 5, 4, 3, 2, or 1 µm subsequent to melt blending the CE with the poly(vinyl acetal) resin.

The CEs added at the beginning of the process can be in the form of a powder having particle sizes ranging from 200 to 400 µm. Subsequent to blending the CE into the poly (vinyl acetal) resin, the CE domain size can decrease by at least about 50, 75, 90, 95, or 99 percent relative to their particle size prior to blending.

In the second process, a CE is first mixed with a carrier poly(vinyl acetal) resin to produce a CE concentrate (i.e., a CE masterbatch), which can subsequently be blended with a poly(vinyl acetal) resin to produce a molten or solid polymer blend. This second process may also be referred to as the "masterbatch process." One advantage of this masterbatch process is that it can more readily disperse CEs having a higher Tg throughout the poly(vinyl acetal) resin. In one embodiment, the masterbatch process involves mixing a high Tg CE with a compatible carrier poly(vinyl acetal) resin to produce a CE concentrate, and then blending the CE concentrate with at least one poly(vinyl acetal) resin to produce a molten or solid polymer blend. The masterbatch has a higher concentration by weight of CE than the concentration of CE in a molten or solid polymer blend or in an interlayer or sheet.

The masterbatch process can have the following steps: a) mixing at least one CE with at least one carrier poly(vinyl acetal) resin for a sufficient time and temperature to mix the CE and the carrier poly(vinyl acetal) resin to thereby produce a CE concentrate; and b) blending the CE concentrate and at least one poly(vinyl acetal) resin to produce a molten or solid polymer blend, wherein the concentration of CE in the concentrate is higher than the concentration of CE in the molten or solid polymer blend.

A sufficient temperature for mixing the CE and the carrier poly(vinyl acetal) resin can be the flow temperature of the CE, which is higher than the Tg of the CE by at least about 10° C., 15° C., 20° C., 25° C., 30° C., 35° C., 40° C., 45° C., or 50° C. The Tg of the CE can be at least about 90° C., 95° C., 100° C., 105° C., or 110° C. Additionally or alternatively, the CE can have a Tg of not more than about 200° C., 180° C., 170° C., 160° C., or 150° C.

In certain embodiments, at least a portion of the mixing of the CE and the carrier poly(vinyl acetal) resin occurs at a temperature of at least about 170° C., 180° C., 190° C., 200° C., or 210° C. Additionally or alternatively, at least a portion of the mixing of the CE and the carrier poly(vinyl acetal) resin occurs at a temperature below 260° C., 250° C., 240° C., 230° C., or 220° C.

In certain embodiments, at least a portion of the blending of the CE concentrate and the poly(vinyl acetal) resin occurs at a temperature that will not degrade the poly(vinyl acetal) resin. For instance, at least a portion of the blending can occur at a temperature of not more than about 180° C., 170° C., 160° C., or 150° C.

Fillers and/or additives can be added during any step of the masterbatch process. In one embodiment, the CE can be modified with a plasticizer or compatibilizer prior to the masterbatch process.

At least a portion of the CE concentrate can be pelletized or granulated prior to being blended with the poly(vinyl acetal) resin.

The CE concentrate can comprise at least 10, or at least 15, or at least 20, or at least 25, or at least 30, or at least 35, or at least 40 weight percent CE based on the weight of the concentrate. Additionally or alternatively, the CE concentrate can comprise not more than 90, or not more than 85, or not more than 80, or not more than 75, or not more than 70, or not more than 65, or not more than 60, or not more than 55, or not more than 50 weight percent of CE, based on the weight of the concentrate. Suitable ranges of CE by weight percent, based on the weight of the CE concentrate or masterbatch, include 10-90, or 10-85, or 10-80, or 10-70, or 10-70, or 10-65, or 10-60, or 10-55, or 10-50, or 15-90, or 15-85, or 15-80, or 15-70, or 15-70, or 15-65, or 15-60, or 15-55, or 15-50, or 20-90, or 20-85, or 20-80, or 20-70, or 20-70, or 20-65, or 20-60, or 20-55, or 20-50, or 25-90, or 25-85, or 25-80, or 25-70, or 25-70, or 25-65, or 25-60, or 25-55, or 25-50, or 30-90, or 30-85, or 30-80, or 30-70, or 30-70, or 30-65, or 30-60, or 30-55, or 30-50, or 35-90, or 35-85, or 35-80, or 35-70, or 35-70, or 35-65, or 35-60, or 35-55, or 35-50, or 40-90, or 40-85, or 40-80, or 40-70, or 40-70, or 40-65, or 40-60, or 40-55, or 40-50.

Similar to the first process, the CEs can effectively soften and/or melt during the masterbatch process, thus allowing the CEs to form into sufficiently small particle sizes under the specified blending conditions. In such an embodiment, due to the small particle sizes, the CEs can be thoroughly dispersed throughout the molten polymer blend as evidenced by good dispersion in the solid polymer blend or interlayer.

In the extrusion process for making the monolithic interlayer sheet, the set temperatures for the zones can be the same or increase incrementally. For example, the set temperature in the last 2 zones or in the last zone can be from 230° C. to 270° C. and in the first half of the zones the temperature can be between 200° C. to 220° C. The throughput rate is not particularly limited and will depend on the capacity of the extruder, but is desirably at least 200 kg/hr. The screw speed is also not limited. A suitable screw speed can range from 150 rpm to 400 rpm. If desired, the extrusion process can be vented. Optionally, the extrusion process can be conducted under an applied vacuum to the barrel. Optionally, the extrusion process can be conducted under an inert gas atmosphere such as nitrogen.

The particular amount of CE and the amount of poly(vinyl acetal) in the polymer blend composition and the monolithic interlayer sheet is dependent upon the desired characteristics and types of CE and poly(vinyl acetal) chosen. Suitable ratios of poly(vinyl acetal) to CE, by weight % based on the weight of the CE and poly(vinyl acetal), include 9:1 to 1:9, or 8:2 to 1:9, or 7:3 to 1:9, or 6:4 to 1:9, or 5:5 to 1:9, or 4:6 to 1:9, or 3:7 to 1:9, or 2:8 to 1:9, or 9:1 to 2:8, or 8:2 to 2:8, or 7:3 to 2:8, or 6:4 to 2:8, or 5:5 to 2:8, or 4:6 to 2:8, or 3:7 to 2:8, or 9:1 to 3:7, or 8:2 to 3:7, or 7:3 to 3:7, or 6:4 to 3:7, or 5:5 to 3:7, or 4:6 to 3:7, or 9:1 to 4:6, or 8:2 to 4:6, or 7:3 to 4:6, or 6:4 to 4:6, or 5:5 to 4:6, or 9:1 to 5:5, or 8:2 to 5:5, or 7:3 to 5:5, or 6:4 to 5:5, or 9:1 to 6:4, or 8:2 to 6:4, or 7:3 to 6:4, or 9:1 to 7:3, or 8:2 to 7:3, or 9:1 to 8:2.

As more CE is added, the storage modulus E' (e.g. stiffness) of the monolithic interlayer and glass panel made with the monolithic interlayer can be improved. However, care should be taken to ensure that other mechanical properties of the interlayer are sufficiently maintained to provide a practical and commercially useful product. For example, an excessive amount of CE can result in an interlayer that easily tears depending on the type of CE and poly(vinyl acetal) and amount of plasticizer used. An amount of poly (vinyl acetal) to CE at a ratio of from 9:1 to 4:6, or an amount of CE of not more than 65 wt. %, or not more than 60 wt. %, or not more than 50 wt. % based on the weight of the CE and poly(vinyl acetal), will assist in maintaining the mechanical properties of the interlayer.

In any of the embodiments of the invention, the monolithic interlayer can be characterized as a disperse phase of CE in a continuous phase of poly(vinyl acetal). A disperse phase of CE can be obtained using less than 50 wt. % CE in the polymer blend.

The monolithic interlayer can also be characterized as a disperse phase of poly(vinyl acetal) in a continuous phase of CE. A disperse phase of poly(vinyl acetal) can be obtained using less than 50 wt. % poly(vinyl acetal) in the polymer blend.

In any of the embodiments of the invention, the polymer blend can be a miscible polymer blend and the interlayer can comprise a polymer blend that is an immiscible polymer blend.

In one example, at least 75, or at least 80, or at least 85, or at least 90, or at least 95, or at least 99.9 percent of the CE in an interlayer can have domain sizes representing the disperse phase of not more than 1 μm in a monolithic interlayer.

The monolithic interlayer made by the polymer blend of the invention can have two Tg values. For example, the interlayer sheet can have a two Tg peaks, one at 65° C. or less and the second at greater than 65° C. Suitable examples include, expressed as a first Tg value up to/a second Tg value greater than: 65/70, or 65/80, or 65/85, or 65/90, or 65/95, or 65/100, or 65/110, or 65/115, or 65/120, or 65/125, or 60/70, or 60/80, or 60/85, or 60/90, or 60/95, or 60/100, or 60/105, or 60/110, or 60/120, or 60/125, or 55/70, or 55/80, or 55/85, or 55/90, or 55/95, or 55/100, or 55/105, or 55/110, or 55/120, or 55/125, or 50/70, or 50/80, or 50/85, or 50/90, or 50/95, or 50/100, or 50/105, or 50/110, or 50/120, or 50/125, or 45/70, or 45/80, or 45/85, or 45/90, or 45/95, or 45/100, or 45/105, or 45/110, or 45/120, or 45/125, or 40/70, or 40/80, or 40/85, or 40/90, or 40/95, or 40/100, or 40/105, or 40/110, or 40/120, or 40/125, or 35/70, or 35/80, or 35/85, or 35/90, or 35/95, or 35/100, or 35/105, or 35/110, or 35/120, or 35/125, or 30/70, or 30/80, or 30/85, or 30/90, or 30/95, or 30/100, or 30/105, or 30/110, or 30/120, or 30/125.

The melt viscosity ratio of the CE to the carrier poly(vinyl acetal) resin can be at least about 0.1, 0.2, 0.3, 0.5, 0.8, or 1.0 as measured at 170° C. and a shear rate of $400^{s-1}$. Additionally or alternatively, the melt viscosity ratio of the CE to the carrier poly(vinyl acetal) resin can be not more than about 2, 1.8, 1.6, 1.4 or 1.2 as measured at 170° C. and a shear rate of $400^{s-1}$.

The melt viscosity ratio of the CE concentrate to the poly(vinyl acetal) resin can be at least about 0.1, 0.2, 0.3, 0.5, 0.8, or 1.0 as measured at 160° C. and a shear rate of 200 $s^{-1}$. Additionally or alternatively, the melt viscosity ratio of the CE concentrate to the poly(vinyl acetal) resin can be not more than about 2, 1.8, 1.6, 1.4, or 1.2 as measured at as measured at 160° C. and a shear rate of 200 $s^{-1}$.

For example, the CE can exhibit a melt viscosity of at least about 75,000, 100,000, or 125,000 poise as measured at 170° C. and a shear rate of 1 rad/sec. Additionally or alternatively, the CE can exhibit a melt viscosity of not more than about 1,000,000, 900,000, or 800,000 poise as measured at 170° C. and a shear rate of 1 rad/sec. The poly(vinyl acetal) resin can exhibit a melt viscosity of at least about 75,000, 100,000, or 125,000 poise as measured at 170° C. and a shear rate of 1 rad/sec. Additionally or alternatively, the poly(vinyl acetal) resin can exhibit a melt viscosity of not more than about 2,000,000, 1,750,000, or 1,600,000 poise as measured at 170° C. and a shear rate of 1 rad/sec.

In another example, the CE can exhibit a melt viscosity of at least about 25,000, 40,000, or 65,000 poise as measured at 170° C. and a shear rate of 10 rad/sec. Additionally or alternatively, the CE can exhibit a melt viscosity of not more than about 400,000, 300,000, or 200,000 poise as measured at 170° C. and a shear rate of 10 rad/sec. The poly(vinyl acetal) resin can exhibit a melt viscosity of at least about 20,000, 30,000, or 40,000 poise as measured at 170° C. and a shear rate of 10 rad/sec. Additionally or alternatively, the poly(vinyl acetal) resin can exhibit a melt viscosity of not more than about 500,000, 400,000, or 300,000 poise as measured at 170° C. and a shear rate of 10 rad/sec.

In yet another example, the CE can exhibit a melt viscosity of at least about 10,000, 15,000, or 20,000 poise as measured at 170° C. and a shear rate of 100 rad/sec. Additionally or alternatively, the CE can exhibit a melt viscosity of not more than about 100,000, 75,000, or 50,000 poise as measured at 170° C. and a shear rate of 100 rad/sec. The poly(vinyl acetal) resin can exhibit a melt viscosity of at least about 10,000, 15,000, or 20,000 poise as measured at 170° C. and a shear rate of 100 rad/sec. Additionally or alternatively, the poly(vinyl acetal) resin can exhibit a melt viscosity of not more than about 100,000, 75,000, or 50,000 poise as measured at 170° C. and a shear rate of 100 rad/sec.

The mixing and blending of the aforementioned processes can be accomplished by any blending methods known in the art. Examples of mixing equipment include, but are not limited to, Banbury mixers, Brabender mixers, roll mills, planetary mixers, single screw extruders, and twin screw extruders. The shear energy during the mixing is dependent on the combination of equipment, blade design, rotation speed (rpm), and mixing time. The shear energy should be sufficient for breaking down softened/melted CE to a small enough size to disperse the CE throughout the poly(vinyl acetal) resin. For example, when a Banbury mixer is utilized, the shear energy and time of mixing can range from about 5 to about 15 minutes at 100 rpms. In certain embodiments of the present invention, at least a portion of the blending and/or mixing stages discussed above can be carried out at a shear rate of at least about 50, 75, 100, 125, or 150 s−1. Additionally or alternatively, at least a portion of the blending and/or mixing stages discussed above can be carried out at a shear rate of not more than about 1,000, 900, 800, 600, or 550 s−1.

It is known in the art that the efficiency of mixing two or more viscoelastic materials can depend on the ratio of the viscosities of the viscoelastic materials. For a given mixing equipment and shear rate range, the viscosity ratio of the dispersed phase (CE, additives) and continuous phase (poly (vinyl acetal) resin) should be within specified limits for obtaining adequate particle size. In one embodiment of the invention where low shear rotational shearing equipment is utilized, such as, Banbury and Brabender mixers, the viscosity ratio of the dispersed phase (e.g., CE, additives) to the continuous phase (e.g., poly(vinyl acetal) resin) can range from about 0.001 to about 5, from about 0.01 to about 5, and from about 0.1 to about 3. In yet another embodiment of the invention where high shear rotational/extensional shearing equipment is utilized, such as, twin screw extruders, the viscosity ratio of the dispersed phase (e.g., CE, additives) to the continuous phase (e.g., poly(vinyl acetal) resin) can range from about 0.001 to about 500 and from about 0.01 to about 100.

It is also known in the art that when mixing two or more viscoelastic materials, the difference between the interfacial energy of the two viscoelastic materials can affect the efficiency of mixing. Mixing can be more efficient when the difference in the interfacial energy between the materials is minimal. In one embodiment of the invention, the surface tension difference between the dispersed phase of CE and continuous poly(vinyl acetal) phase is less than about 100 dynes/cm, less than 50 dynes/cm, or less than 20 dynes/cm.

The thickness, or gauge, of the monolithic interlayer is not limited and can be at least 5 mils, or at least 10 mils, or at least 11 mils, or at least 12 mils, or at least 15 mils, or at least 20 mils, or at least 25 mils, or at least 30 mils, or at least 40 mils, or at least 50 mils. Additionally or in the alternative, the thickness of the monolithic interlayer can be up to 120 mils, or up to 100 mils, or up to 90 mils, or up to 80 mils, or up to 75 mils, or up to 60 mils, or up to 55 mils. Suitable ranges include or 10-120, or 10-100, or 10-90, or 10-80, or 11-80, or 12-80, or 15-80, or 20-80, or 25-80, or 30-80, or 40-80, or 50-80, or 10-75, or 11-75, or 12-75, or 15-75, or 20-75, or 25-75, or 30-75, or 40-75, or 50-75, or 10-70, or 11-70, or 12-70, or 15-70, or 20-70, or 25-70, or 30-70, or 40-70, or 50-70, or 10-65, or 11-65, or 12-65, or 15-65, or 20-65, or 25-65, or 30-65, or 40-65, or 50-65, or 10-60, or 11-60, or 12-60, or 15-60, or 20-60, or 25-60, or 30-60, or 40-60, or 50-60, or 10-55, or 11-55, or 12-55, or 15-55, or 20-55, or 25-55, or 30-55, 40-55, or 50-55, in each case mils.

An optional feature of the invention is that the interlayer sheet laminated against glass can be optically clear. A glass panel made with a poly(vinyl acetal) monolithic interlayer that is laminated on one or between two glass substrates can have good optical clarity. The clarity of monolithic interlayer laminated between glass substrates can be determined by measuring the haze value, which is a quantification of light not transmitted through the sheet glass panel containing the monolithic interlayer. The percent haze can be measured according to ASTM D1003-13—Procedure B using Illuminant C, at an observer angle of 2 degrees. The test is performed with a spectrophotometer, such as a Hunterlab UltraScan XE instrument (commercially available from Hunter Associates, Reston, Va.), on a interlayer sample having a thickness of 0.76 mm, which has been laminated between two sheets of clear glass each having a thickness of 2.3 mm (commercially available from Pittsburgh Glass Works of Pennsylvania).

For example, the interlayer laminated to glass, or a glass panel containing the interlayer of the invention, has a haze value of not more than 2%, or not more than 1.5%, or not more than 1.25%, or not more than 1%, or not more than 0.8%, or not more than 0.7%, or not more than 0.5%, or not more than 0.3%. The haze value can be measured according to the following test:

For other applications, such as privacy glass, the haze value can be larger. For example, the haze value can be from greater than 2% and up to 70%, or at least 5%, or at least 10%, or at least 15%, or at least 20%.

Where optical clarity is desired, a means for achieving good optical clarity is to ensure that the delta RI value between the CE and the poly(vinyl acetal) is small. Thus, the delta RI (the absolute value of the difference between the refractive index of the CE and the refractive index of the poly(vinyl acetal), inclusive of the plasticizer contained in each) is desirably not more than 0.014, or not more than 0.012, or not more than 0.010, or not more than 0.009, or not more than 0.007, or not more than 0.006, or not more than 0.005, or not more than 0.004. Delta RI values of not more than 0.007 provide an excellent optical clarity. Thus, where optical clarity is needed in the desired application, the CE and the poly(vinyl acetal) selected should each have refractive indices that closely match each other as noted by the small delta RI values mentioned above.

The refractive index can be calculated from a Hansen Solubility Parameters Program. An actual refractive index can by measuring according to ASTM D542 at a wavelength of 589 nm and 25° C. or by transferring about 0.4 mL of liquid to the prism surface of an ATAGO RX-7000 (alpha) automatic digital refractometer. The sample should be bubble free for accurate results. The prism is cleaned with acetone between samples.

The E' modulus of the monolithic interlayer is higher with a polymer blend of CE and poly(vinyl acetal) resin over a monolithic layer containing only the same poly(vinyl acetal) resin. The improvement in the storage E' modulus by the use of CE's can be quite significant. By the use of CE, the storage E' modulus at 60° C. and/or at 80° C. can be improved by at least 50%, or at least 100%, or at least 200%, or at least 300%, or at least 400%, or at least 500%, or even as much as 700% or more, or 800% or more, or 900% or more, or 1000% or more. The increase can be calculate by the equation:

$$\text{Increase \%} = \frac{E' \text{ with } CE - E' \text{ without } CE}{E' \text{ without } CE} \times 100$$

The E' modulus of the entire monolithic interlayer structure at 60° C. can be at least 4×106, or at least 5×106, or at least 6×106, or at least 8×106, or at least 1×107, or at least 3×107, or at least 5×107, or at least 6×107, or at least 8×107, or at least 1×108, in each case as pascals.

The E' modulus of the monolithic interlayer structure at 80° C. can be at least 4×106, or at least 5×106, or at least 6×106, or at least 8×106, or at least 1×107, or at least 1.2×107, or at least 2×107, or at least 3×107, or at least 5×107, in each case as pascals.

The storage E' modulus of the monolithic interlayer can be measured according to ASTM D5026-06 (Reapproved 2014). The E' modulus is obtained by the Dynamic Mechanical Analysis using the RSA-II instrument. A 9 mm wide and 0.765 mm thick sample is clamped at the top and bottom and placed in tension. The length of the sample between the clamps is 22 mm. A sinusoidal tensile strain of magnitude 0.01% is applied at a frequency of 1 Hz to the specimen over a range of temperatures and the resulting stress response is measured. Modulus which is a measure of resistance of the material to deformation is obtained from the ratio of stress to strain. For an oscillatory tensile deformation, E' is the real part of the complex modulus and is referred to as the storage modulus. Temperature control is provided by an oven chamber and the heating rate is 3° C./minute.

The monolithic interlayer of the invention also can now be used in applications which require maintaining good modulus at higher temperatures, such as outdoor applications that undergo regular intermittent stresses, caused by such factors as walking or running, or that are load bearing under temperature conditions that exceed 35° C. Examples of applications in which the monolithic interlayer of the invention is suited include staircases, outdoor platforms, pavement or sidewalk platforms, single side balcony laminates, canopies, staircases, support beams, etc.

The monolithic interlayer can be incorporated into a multiple layer panel. As used herein, a multiple layer panel can comprise a single substrate, such as glass, acrylic, or polycarbonate with the monolithic interlayer disposed thereon, and most commonly, with a polymer film further disposed over the monolithic interlayer. The combination of monolithic interlayer and polymer film is commonly referred to in the art as a bilayer. A typical multiple layer panel with a bilayer construct is: (glass)//(monolithic interlayer)//(polymer film) where the monolithic interlayer can comprise at least 3 interlayers as noted above. The polymer film supplies a smooth, thin, rigid substrate that affords better optical character than that usually obtained with a monolithic interlayer alone and functions as a performance enhancing layer. Polymer films differ from any of the layers in the monolithic interlayers, as used herein, in that polymer films are not poly(vinyl acetal) resins and are not CEs. Generally, the polymer films do not themselves provide the necessary penetration resistance, stiffness, and glass retention properties, but rather provide performance improvements, such as infrared absorption characteristics. Poly (ethylene terephthalate) ("PET") is the most commonly used polymer film. A polymer film is desirably thinner than the monolithic interlayer. Suitable polymer film thicknesses can range from about (0.04 mils to 7.9 mils thick, although other thicknesses can be used as desired.

The interlayers of the present disclosure will most commonly be utilized in multiple layer panels comprising two substrates, preferably a pair of glass interlayers, with the interlayers disposed between the two substrates. An example of such a construct would be: (glass)//(monolithic interlayer)//(glass), where the monolithic interlayer can comprise multilayered interlayers as noted above. Further, the multiple layer panel can contain a polymer film, such as (glass)// (monolithic interlayer)//polymer film//(interlayer)//(glass) where the "interlayer" may be any interlayer, including multilayer interlayers. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

Other means for use in de-airing of the interlayer-glass interfaces (steps 2 to 5) known in the art and that are commercially practiced include vacuum bag and vacuum ring processes in which a vacuum is utilized to remove the air.

EXAMPLES

A blend of a CE and poly(vinyl butyral) can be made by melt blending each resin in an extruder to extrude a monolithic interlayer sheet. The CE can be a cellulose ester having the characteristics set forth in Table 3. The poly(vinyl butyral) that can be employed has the characteristics identified in Table 3 below. The refractive indices of each is determined as the values set forth in Table 3. The monolithic interlayer is laminated between two sheets of glass. The storage E' modulus at 60° C. and at 80° C. of the glass panels is reported in Table 3.

CE1: cellulose acetate propionate CAP-504-0.2 available from Eastman Chemical Company.

CE2: cellulose acetate propionate CAP-482.20 available from Eastman Chemical Company.

TABLE 4

| CE1 | PVB | TEG-EH, phr | CE1 phase, phr | PVB phase, phr | CE RI | PVB RI | Delta RI |
|---|---|---|---|---|---|---|---|
| 0.5 | 0.5 | 20 | 13.71 | 26.29 | 1.4698 | 1.4760 | −0.0063 |
| 0.6 | 0.4 | 20 | 14.63 | 28.05 | 1.4696 | 1.4756 | −0.0060 |
| 0.7 | 0.3 | 20 | 15.69 | 30.07 | 1.4693 | 1.4751 | −0.0057 |
| 0.8 | 0.2 | 20 | 16.90 | 32.39 | 1.4690 | 1.4745 | −0.0054 |
| 0.9 | 0.1 | 20 | 18.32 | 35.11 | 1.4687 | 1.4738 | −0.0051 |
| 0.5 | 0.5 | 25 | 17.14 | 32.86 | 1.4690 | 1.4744 | −0.0054 |
| 0.6 | 0.4 | 25 | 18.29 | 35.06 | 1.4687 | 1.4738 | −0.0051 |
| 0.7 | 0.3 | 25 | 19.61 | 37.58 | 1.4684 | 1.4733 | −0.0048 |
| 0.8 | 0.2 | 25 | 21.13 | 40.49 | 1.4681 | 1.4726 | −0.0045 |
| 0.9 | 0.1 | 25 | 22.90 | 43.89 | 1.4677 | 1.4719 | −0.0042 |

The invention claimed is:

1. A monolithic interlayer comprising a polymer blend of:
(A) polyvinyl acetal ("poly(vinyl acetal)"); and
(B) a cellulose ester ("CE"); wherein said poly(vinyl acetal) comprises a polyvinyl butyral resin having a residual OH content ranging from 6-35 wt % PVOH based on the weight of the polyvinyl butyral resin; wherein the monolithic interlayer has a haze value of 4% or less; wherein said cellulose ester layer has a Tg of at least 50° C. and not more than 200° C.

TABLE 3

| 1.25" Extrusion Examples | PVB, g | CE1, g | CE2, g | 3GEH, g | Tinuvin 928, g | Ultranox 626, g | CAP % (Balance PVB) | Haze % ASTM D1003 | Tg PVB Phase, C. | Tg CAP Phase, C. | Storage Modulus at 60° C., Pa | Storage Modulus at 80° C., Pa |
|---|---|---|---|---|---|---|---|---|---|---|---|---|
| 1 (Control) | 750 | 0 | 0 | 285 (38 phr) | 2.625 | 3.75 | 0 | 0.3 | 31 | N/A | 2.9E+06 | 1.4E+06 |
| 2 | 525 | 225 | 0 | 262.5 (35 phr) | 2.625 | 3.75 | 30 | 0.4 | 25 | 100 | 6.2E+07 | 4.2E+07 |
| 3 | 600 | 0 | 150 | 262.5 (35 phr) | 2.625 | 3.75 | 20 | 9.5 | 27 | 109 | 5.0E+07 | 1.8E+07 |
| 4 | 600 | 150 | 0 | 262.5 (35 phr) | 2.625 | 3.75 | 20 | 0.3 | 25 | 100 | 5.1E+07 | 1.7E+07 |

The data in Table 3 indicates that interlayers made with a polymer blend of CE and PVB have two Tg peaks (examples 2-4), thereby improving the overall Tg of the interlayer, compared with one peak at a Tg of 31° C. The storage modulus E' of the interlayer sheets of examples 2-4 by the addition of CE are also dramatically larger compared to the control example 1 that contains no CE. Further, one can obtain an interlayer made with a blend of CE and PVB while maintaining good optical clarity if desired, as shown by the low haze values of Examples 2 and 4 comparable to Example 1 containing no CE.

Prophetic Examples

To obtain good optical clarity, a CE can be selected having a refractive index closely matching the refractive index of the PVB selected as shown in Table 4 below. The delta RI can remain below 0.007 over a wide range of CE/PVB weight ratios, indicating that this particular CE and PVB combination is likely to exhibit low haze over a wide window of CE/PBV ratios. This has the added benefit of designing an interlayer to a weight ratio to a particular storage modulus, adhesion, tear resistance, and flow for processability, along with other mechanical properties desired, while maintaining good optical clarity.

2. The monolithic interlayer of claim 1, wherein said poly(vinyl acetal) comprises polyvinyl butyral ("PVB").

3. The monolithic interlayer of claim 1, wherein the monolithic interlayer has a Tg of at least 43° C.

4. The monolithic interlayer of claim 1, wherein the monolithic interlayer has more than one Tg representing at least the Tg of a poly(vinyl acetal) phase and a Tg of a CE phase, and the Tg of a poly(vinyl acetal) phase is at least 30° C. less than the Tg of a CE phase.

5. The monolithic interlayer of claim 1, wherein the CE has a total degree of substitution ("DS") per AGU of 1.5 to 3.0.

6. The monolithic interlayer of claim 1, wherein the CE comprises a cellulose acetate, cellulose acetate propionate, and/or a cellulose acetate butyrate.

7. The monolithic interlayer of claim 1, wherein the monolithic interlayer comprises a disperse phase of CE in a continuous phase of poly(vinyl acetal).

8. The monolithic interlayer of claim 1, wherein the monolithic interlayer comprises a disperse phase of poly(vinyl acetal) and a continuous phase of CE.

9. The monolithic interlayer of claim 8, wherein the interlayer has a delta RI value of 0.014 or less between the dispersed phase and the continuous phase.

10. A multilayer interlayer comprising:
a first layer comprising a polymer blend of:
(A) polyvinyl acetal ("poly(vinyl acetal)"); and
(B) a cellulose ester ("CE"); and
a second layer comprising a polymer different from the polymer blend of the first layer; wherein said poly(vinyl acetal) comprises a polyvinyl butyral resin having a residual OH content ranging from 6-35 wt % PVOH based on the weight of the polyvinyl butyral resin; wherein the interlayer has a haze value of 4% or less; wherein said cellulose ester layer has a Tg of at least 50° C. and not more than 200° C.

11. The multilayer interlayer of claim 10, wherein the second layer comprises a poly(vinyl acetal) or cellulose ester.

12. The multilayer interlayer of claim 10, further comprising a third layer, wherein the first layer is disposed between the second layer and the third layer.

13. The multilayer interlayer of claim 10, further comprising a third layer, wherein the second layer is disposed between the first layer and the third layer.

14. The multilayer interlayer of claim 12, wherein the third layer comprises a poly(vinyl acetal) or a cellulose ester.

15. The multilayer interlayer of claim 12, wherein the third layer comprises a polymer blend of:
(A) polyvinyl acetal ("poly(vinyl acetal)"); and
(B) a cellulose ester ("CE").

16. A glass panel comprising: at least one layer of glass; and
an interlayer comprising a polymer blend of:
(A) polyvinyl acetal ("poly(vinyl acetal)"); and
(B) a cellulose ester ("CE");
wherein the percent haze of the glass panel is 4% or less.

17. The glass panel of claim 16, further comprising a second glass layer, wherein the interlayer is disposed between the two layers of glass.

18. The glass panel of claim 17, wherein the interlayer comprising a polymer blend is a first layer, and wherein the glass panel further comprises a second layer comprising a polymer different from the polymer blend of the first layer.

19. The glass panel of claim 18, wherein the second layer comprises a cellulose ester or poly(vinyl acetal).

20. The glass panel of claim 19, further comprising a third layer, wherein the first layer is disposed between the second layer and the third layer.

21. The glass panel of claim 19, further comprising a third layer, wherein the second layer is disposed between the first layer and the third layer.

22. The glass panel of claim 20, wherein the third layer comprises a poly(vinyl acetal) or a cellulose ester.

23. The glass panel of claim 21, wherein the third layer comprises a polymer blend of:
(A) polyvinyl acetal ("poly(vinyl acetal)"); and
(B) a cellulose ester ("CE").

* * * * *